(12) United States Patent
Chang et al.

(10) Patent No.: US 9,555,571 B1
(45) Date of Patent: Jan. 31, 2017

(54) METHOD FOR OPERATING A MOLDING MACHINE WITH A PREDICTED IN-MOLD PVT WAVEFORM OF A MOLDING RESIN

(71) Applicant: CORETECH SYSTEM CO., LTD., Hsinchu County (TW)

(72) Inventors: Yuing Chang, Hsinchu County (TW); Rong Yeu Chang, Hsinchu County (TW); Chia Hsiang Hsu, Hsinchu County (TW); Chuan Wei Chang, Hsinchu County (TW); Ching Chang Chien, Hsinchu County (TW); Hsien Sen Chiu, Hsinchu County (TW)

(73) Assignee: CORETECH SYSTEM CO., LTD., Hsinchu (TW)

( * ) Notice: Subject to any disclaimer, the term of this patent is extended or adjusted under 35 U.S.C. 154(b) by 0 days.

(21) Appl. No.: 14/934,127

(22) Filed: Nov. 5, 2015

(51) Int. Cl.
*B29C 45/77* (2006.01)
*G05B 19/401* (2006.01)
(Continued)

(52) U.S. Cl.
CPC ........... *B29C 45/77* (2013.01); *B29C 33/3835* (2013.01); *B29C 45/76* (2013.01); *B29C 45/78* (2013.01);
(Continued)

(58) Field of Classification Search
CPC ...... B29C 33/3835; B29C 45/76; B29C 45/77; B29C 45/78; B29C 2945/76006; B29C 2945/7604; B29C 2945/76381; G06F 17/5009; G06F 2217/16; G06F 2217/41; G05B 2219/45244
(Continued)

(56) References Cited

U.S. PATENT DOCUMENTS 5,035,598 A * 7/1991 Fujita .................... B29C 45/768
264/40.3
5,097,431 A * 3/1992 Harada .................... B29C 45/76
264/328.1
(Continued)

OTHER PUBLICATIONS

Chang, Rong-Yeu et al., Numerical simulation of mold filling in injection molding using a three-dimensional finite volume approach, International Journal for Numerical Methods in Fluids, Int. J. Numer. Meth. Fluids 2001; 37: 125-148 (DOI: 10.1002/fld. 166).
(Continued)

*Primary Examiner* — Crystal J Barnes-Bullock
(74) *Attorney, Agent, or Firm* — WPAT, P.C., Intellectual Property Attorneys; Anthony King

(57) ABSTRACT

A method for operating a molding machine includes steps of specifying a simulating domain corresponding to a genuine domain in a mold disposed on the molding machine; performing a virtual molding by using an initial packing pressure profile to generate an initial state waveform expressing a relationship between an in-mold pressure and an in-mold temperature of the molding resin; obtaining an updated packing pressure profile for applying a molding pressure to at least a portion of the genuine domain while taking into consideration the initial state waveform; repeating the virtual molding while taking into consideration the updated packing pressure profile to generate an updated state waveform of the molding resin; and setting the molding machine taking into consideration the updated packing pressure profile to perform an actual molding by applying an actual molding pressure to the at least a portion of the genuine domain to prepare the molding product.

22 Claims, 22 Drawing Sheets

(51) Int. Cl.
    *B29C 45/76*     (2006.01)
    *B29C 45/78*     (2006.01)
    *B29C 33/38*     (2006.01)
    *G06F 17/50*     (2006.01)

(52) U.S. Cl.
    CPC ......... G05B 19/401 (2013.01); G06F 17/5009 (2013.01); *B29C 2945/7604* (2013.01); *B29C 2945/76006* (2013.01); *B29C 2945/76381* (2013.01); *B29C 2945/76946* (2013.01); *B29C 2945/76986* (2013.01); *G05B 2219/37399* (2013.01); *G05B 2219/45244* (2013.01); *G06F 2217/16* (2013.01); *G06F 2217/41* (2013.01)

(58) Field of Classification Search
    USPC ................. 264/40.1, 40.5, 40.6, 40.7, 328.1; 700/197, 200, 203; 703/2, 6, 9; 425/149
    See application file for complete search history.

(56) References Cited

U.S. PATENT DOCUMENTS

| | | | | |
|---|---|---|---|---|
| 5,756,017 A | * | 5/1998 | Togawa | B29C 45/77 264/319 |
| 6,658,319 B2 | * | 12/2003 | Shioiri | B29C 45/766 264/40.1 |
| 6,816,820 B1 | * | 11/2004 | Friedl | B29C 33/3835 703/2 |
| 7,323,125 B2 | * | 1/2008 | Uwaji | B29C 45/7693 264/328.1 |
| 7,574,339 B2 | * | 8/2009 | Lukis | G06F 17/505 700/197 |
| 8,460,586 B2 | * | 6/2013 | Kariya | B29C 45/762 264/40.5 |
| 8,768,662 B2 | * | 7/2014 | Chang | B29C 45/7693 703/2 |
| 9,283,695 B1 | * | 3/2016 | Tseng | B29C 45/7693 |
| 9,409,335 B1 | * | 8/2016 | Su | B29C 45/78 |
| 2004/0047935 A1 | * | 3/2004 | Moss | B29C 45/27 425/145 |
| 2010/0036646 A1 | * | 2/2010 | Hisai | G06F 17/5018 703/1 |

OTHER PUBLICATIONS

Ranner, Lars-Erik, On optimization of injection molding cooling, thesis for the degree of doctor ingenior, Norwegian university of Science and Technology, Apr. 2008.

* cited by examiner

METHOD FOR OPERATING A MOLDING MACHINE WITH A PREDICTED IN-MOLD PVT WAVEFORM OF A MOLDING RESIN

TECHNICAL FIELD

The present disclosure relates to a method for operating a molding machine, and more particular, to a molding-condition setting method of a molding machine for preparing a molding product taking into consideration of a predicted in-mold PVT (Pressure-Specific Volume-Temperature) waveform of a molding resin.

DISCUSSION OF THE BACKGROUND

Injection molding is a technology commonly used for high-volume manufacturing of parts made of synthetic resin, most commonly made of thermoplastic polymers. During a repetitive injection molding process, a plastic resin, most often in the form of small beads or pellets, is introduced to an injection molding machine that melts the resin beads under heat, pressure, and shear. The now molten resin is forcefully injected into a mold cavity having a particular cavity shape. The injected plastic is held under pressure in the mold cavity, cooled, and then removed as a solidified part having a shape that essentially duplicates the cavity shape of the mold.

A typical injection molding procedure comprises four basic operations: (1) heating the plastic in the injection molding machine to allow it to flow under pressure; (2) injecting the melted plastic into a mold cavity or cavities defined between two mold halves that have been closed; (3) allowing the plastic to cool and harden in the cavity or cavities while under pressure; and (4) opening the mold halves to cause the part to be ejected from the mold. In the conventional injection molding of synthetic resin by an injection molding machine, the weight of the injected synthetic resin varies with the molten resin pressure, the molten resin specific volume or the molten resin temperature etc. Therefore, it is difficult to form products of a constant quality.

In general, the setting of molding conditions of the injection molding machine requires a large number of trial molding operations and a long setting time because the setting work greatly depends on the know-how and experience of an operator of the injection molding machine, and various physical values affect one another as well.

Therefore, a virtual molding, i.e., computer-implemented simulation, by use of CAE (Computer-Assisted Engineering) is performed for the injection molding, and the molding conditions are then set based on the virtual molding. In virtual molding by use of CAE, phenomena will occur in a mold cavity within a short period of time, i.e., the result of simulation on resin temperature, pressure, shear rate, etc. can be reflected in molded products. Therefore, if the molding phenomena occurring within a mold cavity can be grasped accurately, using CAE may enable optimization of molding conditions and a stable molding of non-defective products.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

One aspect of the present disclosure provides a method for operating a molding machine, and more particular, to a molding-condition setting method of a molding machine for preparing a molding product taking into consideration of a predicted in-mold PVT (Pressure-Specific Volume-Temperature) waveform of a molding resin.

In accordance with some embodiments of the present disclosure, a method for operating a molding machine comprises steps of specifying a simulating domain corresponding to a genuine domain in a mold disposed on the molding machine, wherein the genuine domain has a mold cavity to be filled with a molding resin from the molding machine to prepare a molding product; performing a virtual molding by using an initial packing pressure profile to generate an initial state waveform expressing a relationship between an in-mold pressure and an in-mold temperature of the molding resin; obtaining an updated packing pressure profile for applying a molding pressure to at least a portion of the genuine domain while taking into consideration the initial state waveform; repeating the virtual molding while taking into consideration the updated packing pressure profile to generate an updated state waveform of the molding resin; and setting the molding machine taking into consideration the updated packing pressure profile to perform an actual molding by applying an actual molding pressure to the at least a portion of the genuine domain to prepare the molding product.

In accordance with some embodiments of the present disclosure, a non-transitory computer medium contains computer instructions stored therein for causing a computer processor to perform operations for setting a molding machine, and the operations comprise steps of specifying a simulating domain corresponding to a genuine domain in a mold disposed on the molding machine, wherein the genuine domain has a mold cavity to be filled with a molding resin from the molding machine to prepare a molding product; performing a virtual molding by using an initial packing pressure profile to generate an initial state waveform expressing a relationship between an in-mold pressure and an in-mold temperature of the molding resin; obtaining an updated packing pressure profile for applying a molding pressure to at least a portion of the genuine domain while taking into consideration the initial state waveform; repeating the virtual molding while taking into consideration the updated packing pressure profile to generate an updated state waveform of the molding resin; and setting the molding machine taking into consideration the updated packing pressure profile to perform an actual molding by applying an actual molding pressure to the at least a portion of the genuine domain to prepare the molding product.

The convention operation of the injection molding may use a constant packing pressure to apply a pressure to the sprue portion of the mold, and the constant packing pressure could be a random value assigned by an operator of the injection machine according to the operator's experience. However, setting the packing pressure of the injection molding requires a large number of trial molding operations and a long setting time actually performed on the injection molding machine because the setting work greatly depends on the know-how and experience of an operator of the injection molding machine, and various physical values affect one another as well.

In contrast, the present disclosure implements the large number of trial molding operations by the molding simulation technique so as to obtain a packing pressure profile, which can result in a state waveform of the molding product with the designed property (specific volume). Subsequently, the molding machine is set taking into consideration the packing pressure profile to apply an actual pressure to the at least a portion of the genuine domain.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "some embodiments of the present disclosure," "an embodiment," "exemplary embodiment," "other embodiments of the present disclosure," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a method for setting a molding machine and non-transitory computer medium for use in a molding process performed by a molding machine. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
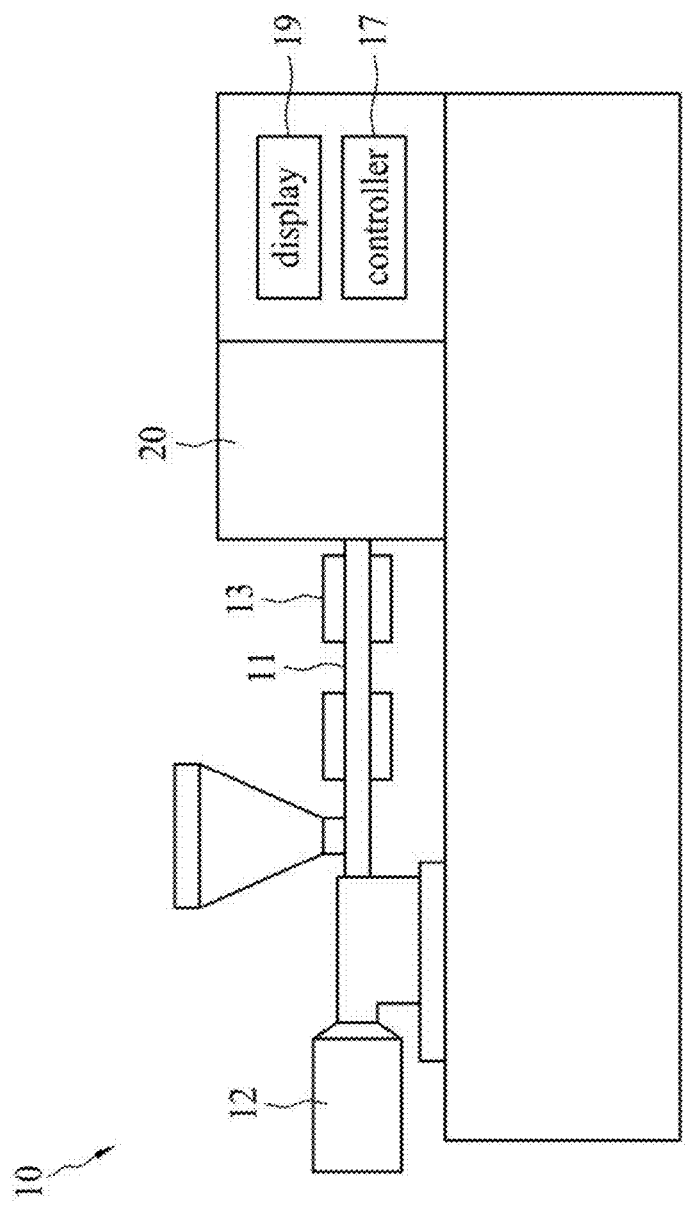
FIG. 1 and FIG. 2 are schematic views of an injection molding machine equipped with a metal mold in accordance with some embodiments of the present disclosure.
Figure 2:
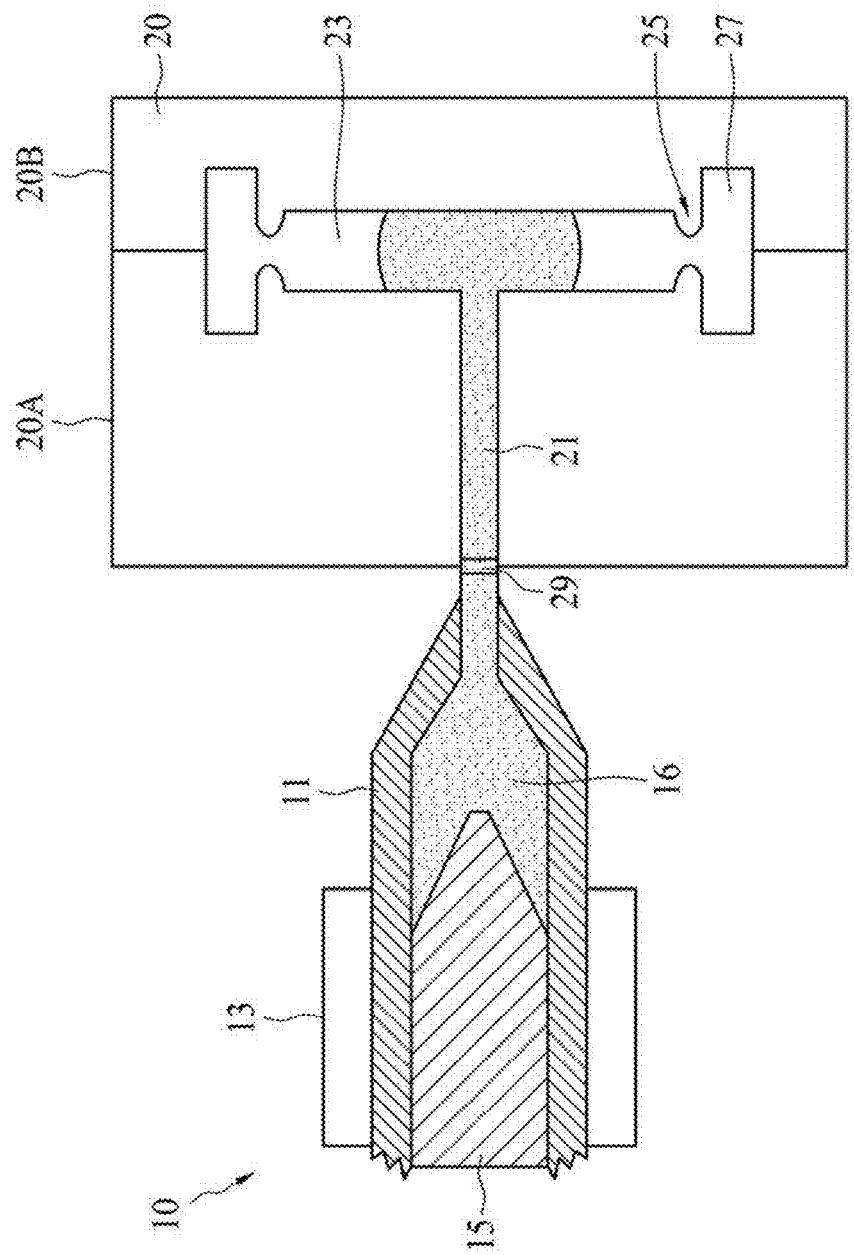

FIG. 1 and FIG. 2 are schematic views of an injection molding machine 10 equipped with a metal mold 20 in accordance with some embodiments of the present disclosure. The injection molding machine 10 includes a screw chamber 11, heating elements 13 configured to heat the screw chamber 11, and a screw 15 positioned in the screw chamber 11 and driven by a screw-driving motor 12 for feeding a molding resin 16, such as thermoplastics, into a mold cavity 25 of the metal mold 20. The injection machine 10 has a controller 17 configured to control the operation of the injection molding machine 10 and a display 19 configured to display information of the injection molding process.

The metal mold 20 is constituted by a fixed-side metal mold 20A and a movable-side metal mold 20B. Inside the metal mold 20, a sprue portion 21, a runner portion 23, a gate portion 25 and a mold cavity 27 are formed so as to be arranged in the above-mentioned order from the injection molding machine 10. The sprue portion 21 of the metal mold 20 is connected to the barrel 11 of the molding machine 10 via a nozzle 29.

Figure 3:
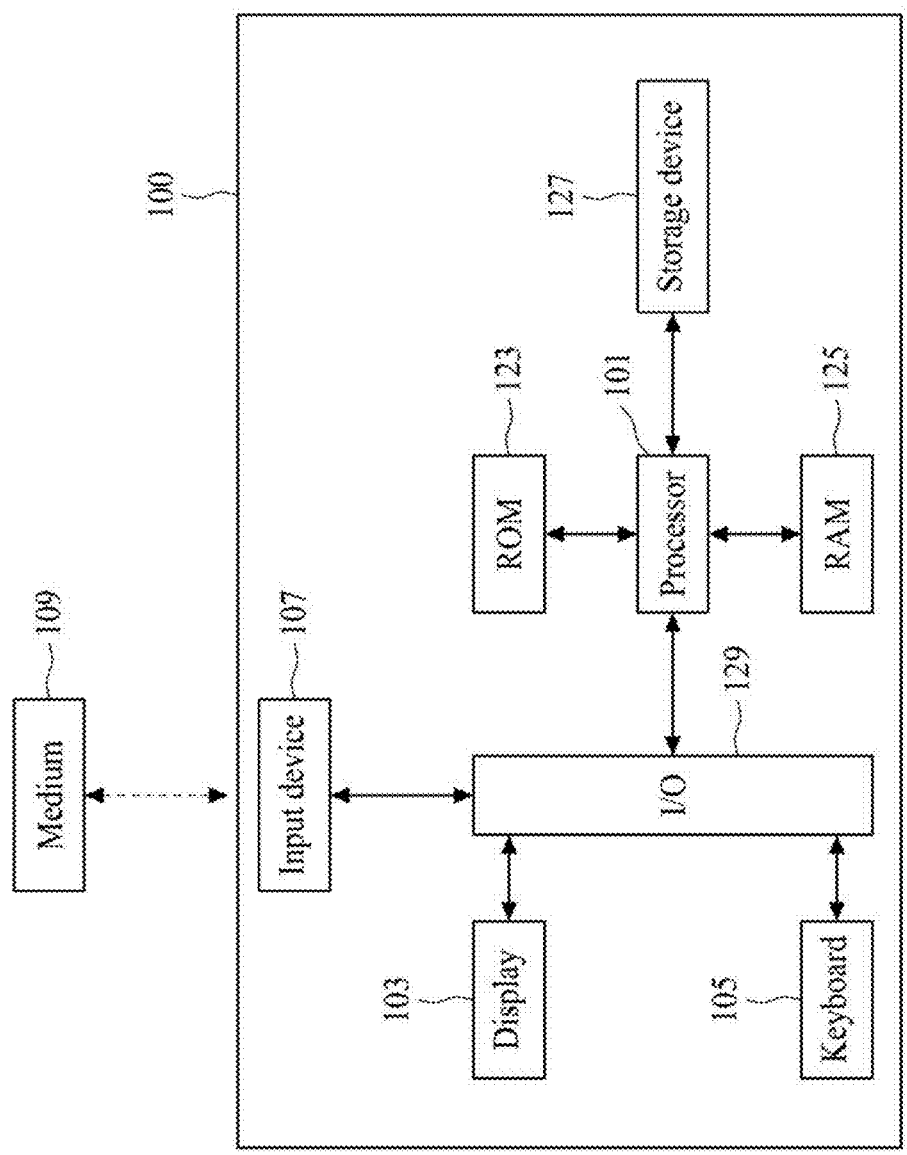
FIG. 3 is a functional block diagram of a computing apparatus in accordance with some embodiments of the present disclosure.

FIG. 3 is a functional block diagram of a computing apparatus 100 in accordance with some embodiments of the present disclosure. In some embodiments of the present disclosure, the computing apparatus 100 comprises a computer processor 101 for performing a computer-implemented injection molding simulation method. In some embodiments of the present disclosure, the computing apparatus 100 includes a read-only memory (ROM) 123, a random access memory (RAM) 125, a storage device 127, and an input/output (I/O) interface 129. The computer processor 101 operably communicates with the ROM 123, the RAM 125, the storage device 127, and the I/O interface 129.

In some embodiments of the present disclosure, the computing apparatus 100 may further include a display 103, a keyboard 105, and an input device 107 such as a card reader or an optical disk drive. The input device 107 is configured to input computer instructions (software algorithms) stored in a non-transitory computer-readable medium 109, and the computer processor 101 is configured to execute operations for performing a computer-implemented injection molding simulation method according to the computer instructions. The computer processor 101 reads software algorithms from the input device 107 or the storage device 127, executes the calculation steps, and stores the calculated result in the RAM 125. In some embodiments of the present disclosure, the memory device, i.e., the ROM 123 and the RAM 125, can be programmed to store codes for performing the computer-implemented injection molding simulation method.

Figure 4:
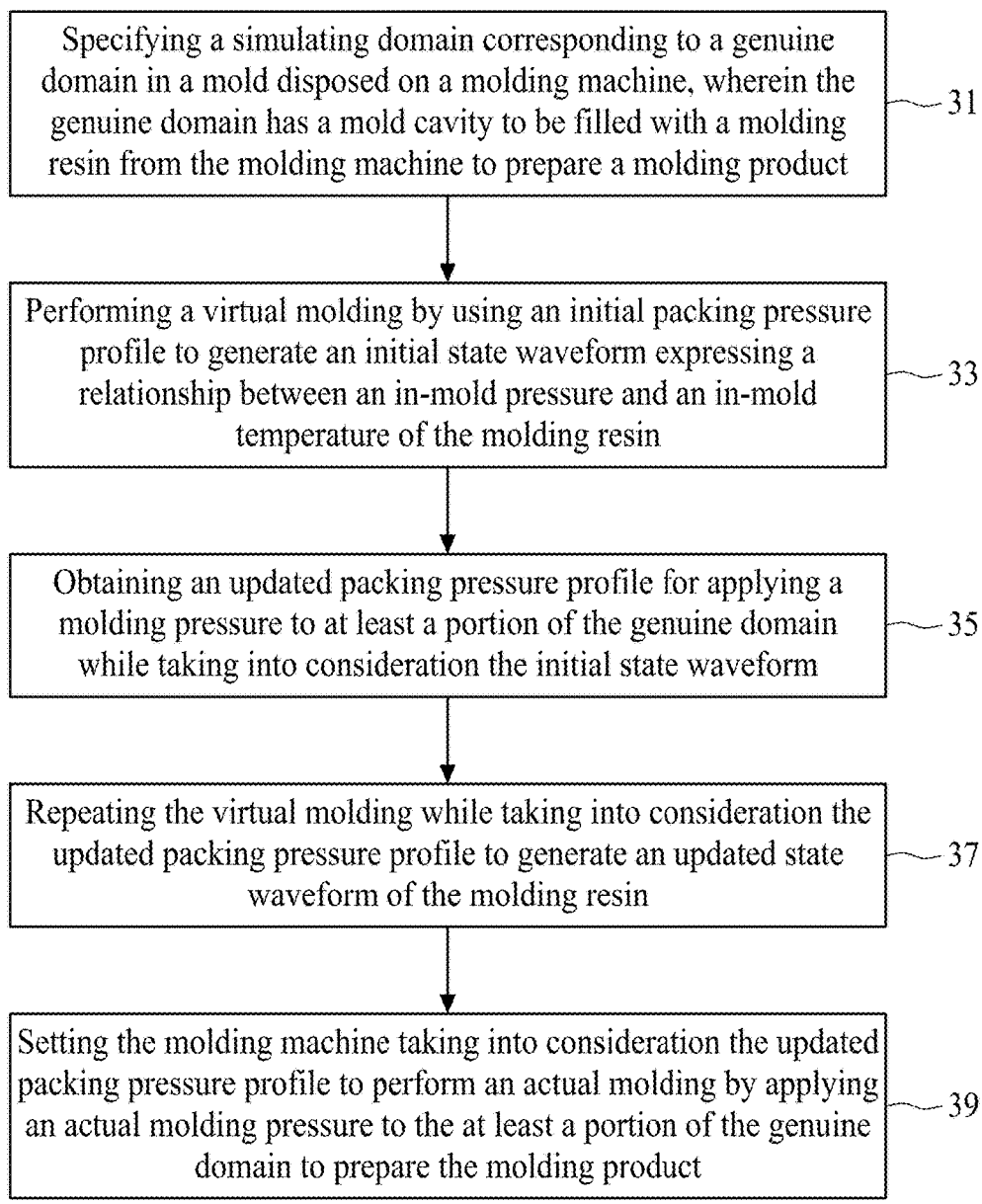
FIG. 4 is a flow chart of the method for operating a molding machine in accordance with some embodiments of the present disclosure.

FIG. 4 is a flow chart of the method 30 for operating a molding machine in accordance with some embodiments of the present disclosure. The method can be considered a molding-condition setting method for the molding machine, which comprises a step 31 of specifying a simulating domain, wherein the simulating domain corresponds to a genuine domain in a mold disposed on a molding machine, wherein the genuine domain has a mold cavity to be filled with a molding resin from the molding machine; a step 33 of performing at least one virtual molding to generate a state waveform expressing a relationship between an in-mold pressure and an in-mold temperature of the molding resin; a step 35 of obtaining a packing pressure profile for applying a molding pressure to at least a portion of the genuine domain while taking into consideration the state waveform; a step 37 of repeating the virtual molding while taking into consideration the packing pressure profile to generate an updated state waveform of the molding resin; and a step 39 of setting the molding machine to apply an actual pressure to the at least a portion of the genuine domain while taking into consideration the updated state waveform.

The following describes an exemplary process flow of the method 30 in accordance with some embodiments of the present disclosure.

Figure 5:
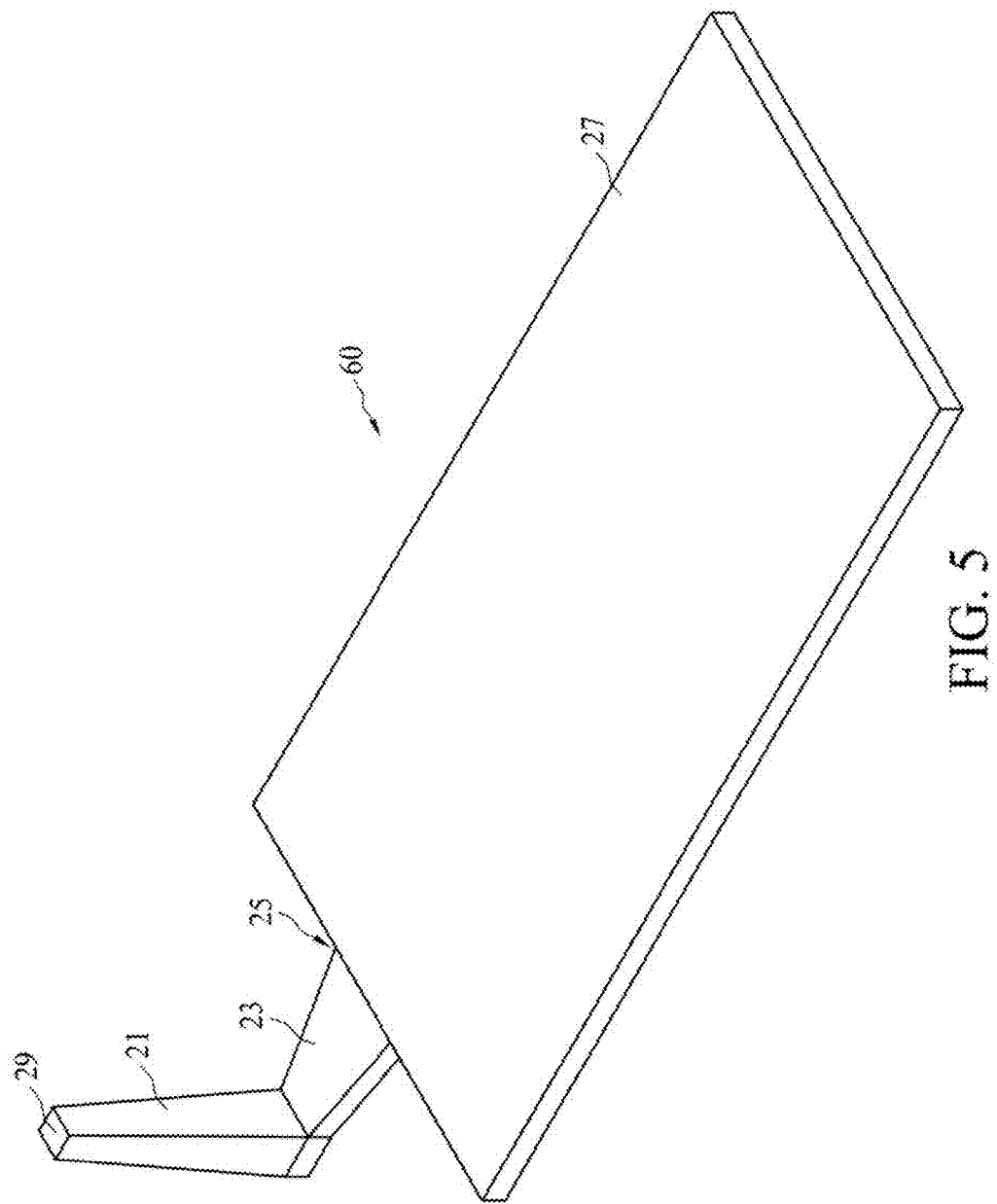
FIG. 5 is a schematic view of a genuine domain 60 in accordance with some embodiments of the present disclosure.

FIG. 5 is a schematic view of a genuine domain 60 in accordance with some embodiments of the present disclosure. Referring back to FIG. 2, the metal mold 20 may be divided into two parts: a metal part and space part defined by the metal part. The genuine domain 60 is an example of the space part of the metal mold 20. In some embodiments of the present disclosure, the method 30 can begin in the step 31 where a simulating domain is specified. In some embodiments of the present disclosure, the simulating domain is obtained from a CAD (Computer Aided Design) model used in design and development of a product.

Figure 6:
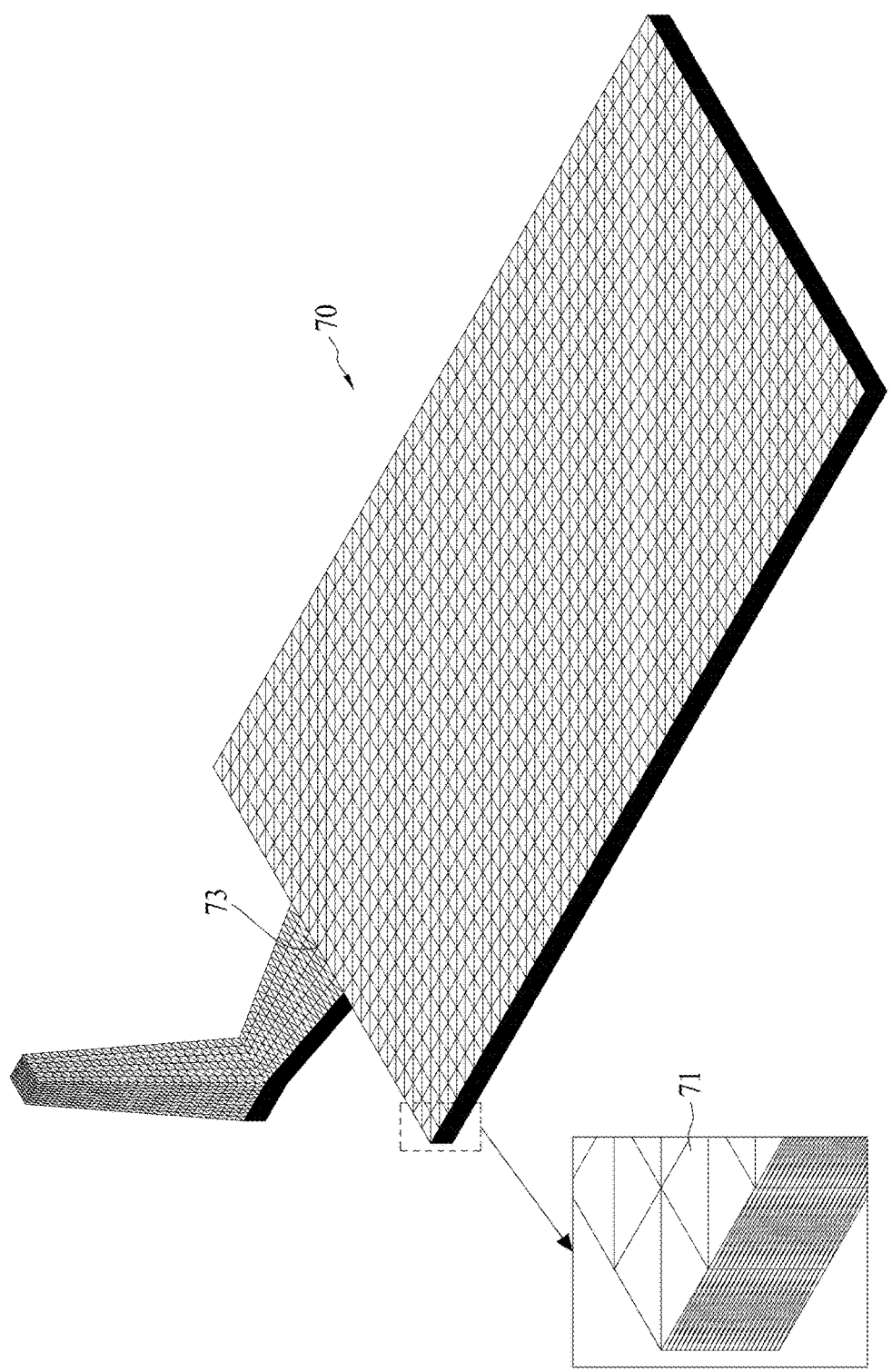
FIG. 6 is a schematic view of a simulating domain corresponding to the genuine domain in accordance with some embodiments of the present disclosure.

FIG. 6 is a schematic view of a simulating domain 70 corresponding to the genuine domain 60 in accordance with some embodiments of the present disclosure. In some embodiments of the present disclosure, a mesh is created by dividing at least part of the simulating domain 70 before actually applying a numerical analysis, such as an FEM (finite element method), an FDM (finite difference method) or an FVM (finite volume method), to the simulating domain 70. The creation of the mesh for the simulating domain 70 is a technique of modeling an object or fluid region (i.e., the simulating domain 70 of the present embodiment) to be analyzed with a set of elements 71, such as rectangular mesh, hexahedral mesh or tetrahedral mesh, in order to perform the subsequent numerical analysis.

In the step 33, a simulation process is performed to simulate an injection molding process of a molding resin that is injected into the simulating domain 70. In some embodiments of the present disclosure, the simulation process includes a virtual molding performed to generate a state waveform expressing a relationship between an in-mold pressure and an in-mold temperature of the molding resin. In some embodiments of the present disclosure, the state waveform represents the variation of a specific volume of the molding resin with respect to the in-mold pressure and the in-mold temperature during a single shot of the injection molding process.

Figure 7:
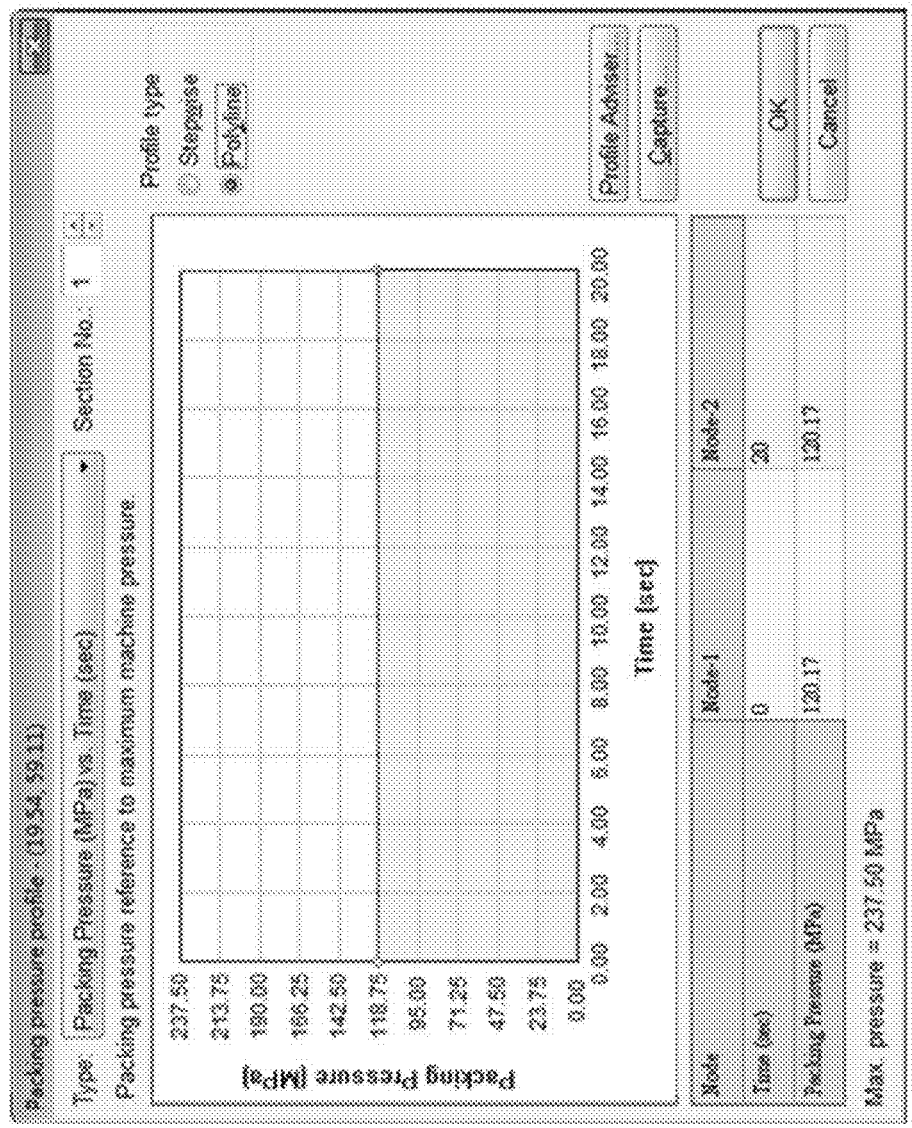
FIG. 7 is an initial packing pressure profile to be applied to at least a portion of the genuine domain in accordance with some embodiments of the present disclosure.

FIG. 7 is a packing pressure profile to be applied to at least a portion of the genuine domain 60 in accordance with some embodiments of the present disclosure. In some embodiments of the present disclosure, the simulation process uses the packing pressure profile for simulating the application of a packing pressure applied to the sprue 61 of the genuine domain 60. In some embodiments of the present disclosure, the packing pressure profile may be a single pressure value (e.g., the initial packing pressure, 120.17 MPa in FIG. 7), which can be obtained according to the experience of an operator of the injection molding machine 10. In some embodiments of the present disclosure, the packing pressure profile may be a waveform with varying pressure values, which can be obtained from the injection molding machine 10 after a trial molding operation. In some embodiments of the present disclosure, the packing pressure profile may be a waveform with varying pressure values, which is obtained from a trial simulation process of the injection molding operation.

The molding phenomena of the molding resin 16 can be simulated by using the following governing equations (1)-(4):

$$\frac{\partial \rho}{\partial t} + \nabla \cdot \rho u = 0 \qquad (1)$$

$$\frac{\partial}{\partial t}(\rho u) + \nabla \cdot (\rho u u + \tau) = -\nabla p + \rho g \qquad (2)$$

$$\frac{\partial}{\partial t}(T\rho C_P) + \nabla \cdot (\rho u C_P T) = k\nabla^2 T + \eta \dot{\gamma}^2 \qquad (3)$$

$$\tau = -\eta(T, \dot{\gamma}) \cdot (\nabla u + \nabla u^T) \qquad (4)$$

where u represents the velocity vector (flow velocity), T represents the temperature, t represents the time, p represents the pressure, $\tau$ represents the total stress tensor, $\rho$ represents the density, $\eta$ represents the viscosity, k represents the thermal conductivity, $C_p$ represents the specific heat, and $\dot{\gamma}$ represents the shear rate.

In one embodiment of the present disclosure, in the step 33, solving the governing equations (1)-(4) uses the pressure of the packing pressure profile in FIG. 7 to set the boundary conditions of the governing equations (1)-(4) at the nozzle 29 of the genuine domain 60. Solving the governing equations (1)-(4) requires the transient state analysis (virtual molding), which can be performed numerically by using a computer. See, e.g., Rong-yeu Chang, and Wen-hsien Yang, Numerical simulation of mold filling in injection molding using a three-dimensional finite volume approach, International Journal for Numerical Methods in Fluids Volume 37, Issue 2, pages 125-148, Sep. 30, 2001, and the entirety of which is herein incorporated by reference. During the transient state analysis, the process variables that change with time are not zero; i.e., the partial derivatives (a/at) in the governing equations (1)-(4) are not considered zero.

Figure 8:
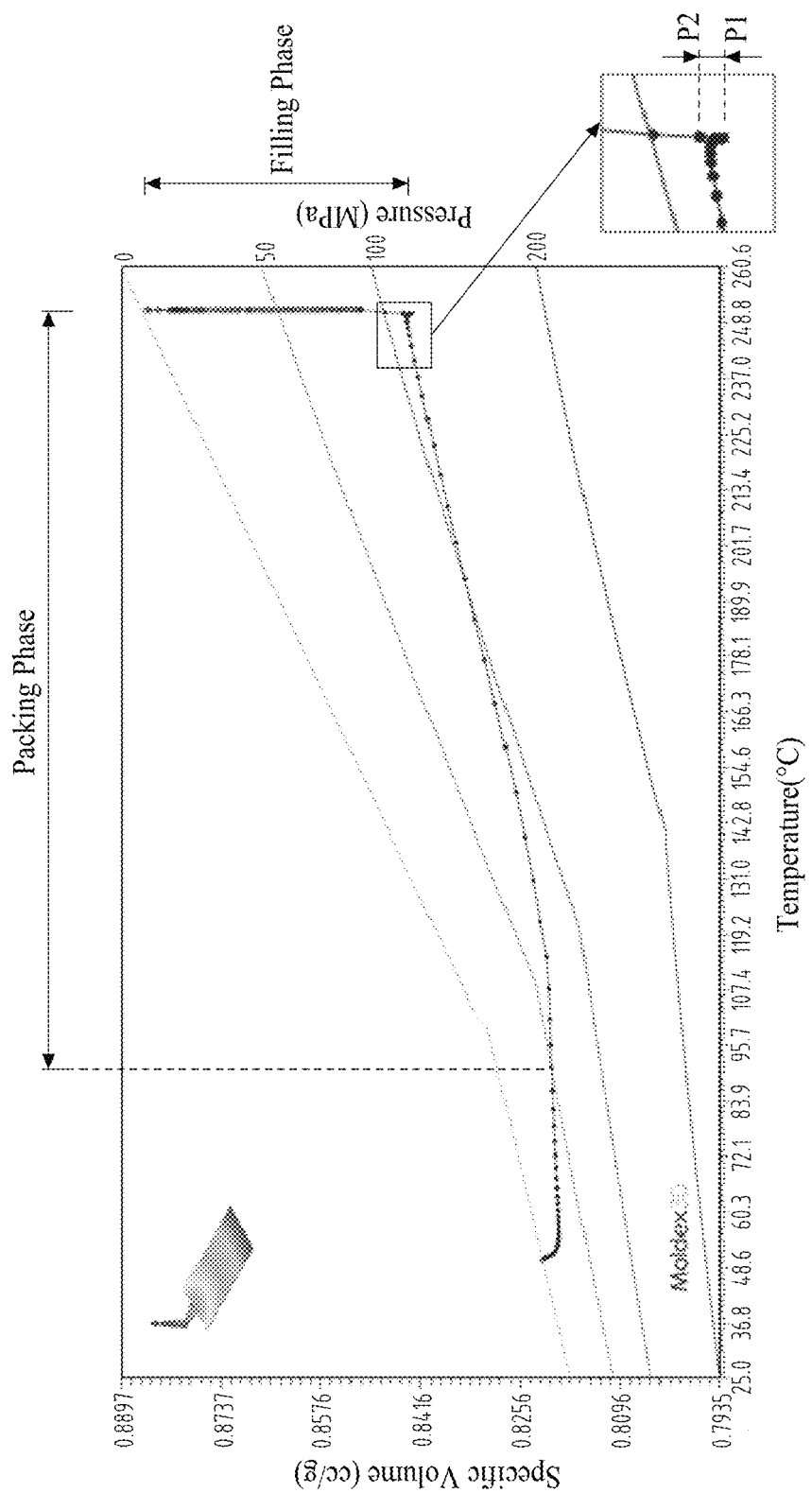
FIG. 8 is an initial state waveform of a portion of the simulating domain from the virtual molding in accordance with some embodiments of the present disclosure.

FIG. 8 is a state waveform of a portion of the simulating domain 70 from the virtual molding in accordance with some embodiments of the present disclosure. In some embodiments of the present disclosure, in the step 33, solving the governing equations (1)-(4) by the transient state analysis generates the state waveform as shown in FIG. 8, expressing a relationship between an in-mold pressure and an in-mold temperature of the molding resin 16 at a predetermined portion 73 of the simulating domain 70 shown in FIG. 6, wherein the predetermined portion 73 corresponds to a portion of the mold cavity 27 around the gate portion 25 in FIG. 5. In some embodiments of the present disclosure, the state (PVT) waveform may optionally express the pressure (P), the specification volume (V), the temperature (T) of the molding resin 16 at any portion of the mold cavity 27.

In step 35, an updated packing pressure profile is generated for applying a molding pressure to at least a portion of the genuine domain 60 while taking into consideration the state waveform. Referring to FIG. 8, in some embodiments of the present disclosure, the state waveform includes a filling phase and a packing phase following the filling phase, and a transition node (e.g., the beginning of the packing phase right after the filling phase) has an initial holding pressure (P1) between the filling phase and the packing phase, wherein a dropping pressure (P2) is also depicted in a close-up view of FIG. 8. The dropping pressure (P2) indicates that the molding resin 16 flows from the interior of the mold cavity 27 back to the runner portion 23, opposite to the filling phase where the molding resin 16 flows from the runner portion 23 toward the interior of the mold cavity 27.

In some embodiments of the present disclosure, when the initial state waveform has a pressure drop ($\Delta P=P1-P2$) larger than a predetermined range (for example, 5% of the initial pressure, i.e., P1) around the transition node (in this example, P1=115.247 MPa, P2=109.389 MPa), a backflow adjusting process is performed to generate a new holding pressure taking into consideration the pressure drop ($\Delta P$). In some embodiments of the present disclosure, the new holding pressure (126.28 MPa) is calculated by a formula $(P_{h1}+(\Delta P)/P1)*P_{h1})$, where $P_{h1}$ represents the initial holding pressure (120.17 MPa) of the packing pressure profile in FIG. 7.

Referring to FIG. 8, the packing phase ends at a gate-freezing time of 3.809 second, a gate-freezing pressure ($P_{freezing}$) of 46.6 Mpa, and a gate-freezing temperature of 86.04° C. In some embodiments of the present disclosure, the gate-freezing time is determined by checking if the calculated temperature of the state waveform is lower than a freezing temperature, which is a temperature slightly lower than a glass-transition temperature of the molding resin 16. In term of the packing pressure before the gate-freezing node, an over-pressure would spill the injected molding resin out of the metal mold, and an under-pressure would result in a serious shrinkage of the molding product due to insufficient molding resin injected into the mold cavity. Therefore, a substantial isobaric packing phase is preferred. The pressure of the initial state waveform in FIG. 8, decreasing from 115.247 MPa at the beginning to 46.6 MPa at the end (the gate-freezing), shows the packing phase is not isobaric, i.e., the pressure (46.6 MPa) at the end of the packing phase is too low and shall be increased. The new holding pressure (126.28 MPa) with increased pressure helps to implement the isobaric packing phase.

Figure 9:
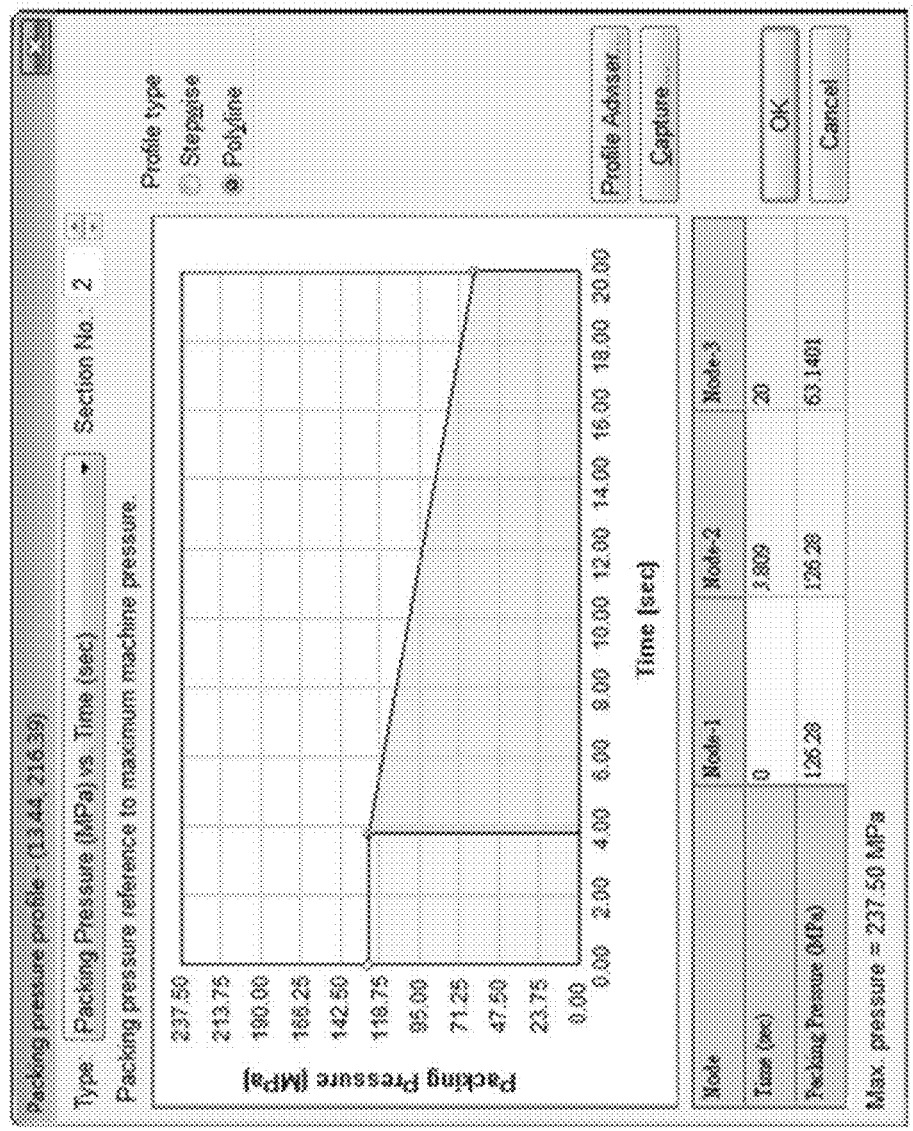
FIG. 9 is a packing pressure profile to be applied to at least a portion of the genuine domain in accordance with some embodiments of the present disclosure.

FIG. 9 is a packing pressure profile to be applied to at least a portion of the genuine domain 60 in accordance with some embodiments of the present disclosure. The packing pressure profile in FIG. 7 is considered an initial packing pressure profile, the state waveform in FIG. 8 is considered an initial state waveform, and packing pressure profile in FIG. 9 is relatively considered an updated packing pressure profile.

In some embodiments of the present disclosure, the packing pressure profile in FIG. 9 is obtained by dividing the previous packing pressure profile (considered an initial packing pressure profile) in FIG. 7 into a plurality of sections by adding control nodes; for example, a single section is divided into two sections with an added control node (the node 2). In some embodiments of the present disclosure, the first section from the node 1 to node 2 is set to perform the new holding pressure (126.28 MPa), and the new control node is set to be the gate-freezing time of the molding process. The packing pressure profile in FIG. 9 is designed to implement a packing phase before the node 2 and a cooling phase after the node 2. Considering the pressure of the molding process after the packing phase is generally decreasing to the normal pressure, the pressure of the packing pressure profile in the cooling phase following the packing phase is temporarily set to be a half of the ending pressure of the packing phase (126.28 MPa), e.g., 63.14 MPa.

In step 37, the virtual molding is repeated while taking into consideration the updated packing pressure profile to generate an updated state waveform of the molding resin. In one embodiment of the present disclosure, in the step 37, solving the governing equations (1)-(4) uses the updated packing pressure profile in FIG. 9 to set the boundary conditions of the governing equations (1)-(4) at the nozzle 29 of the genuine domain 60.

Figure 10:
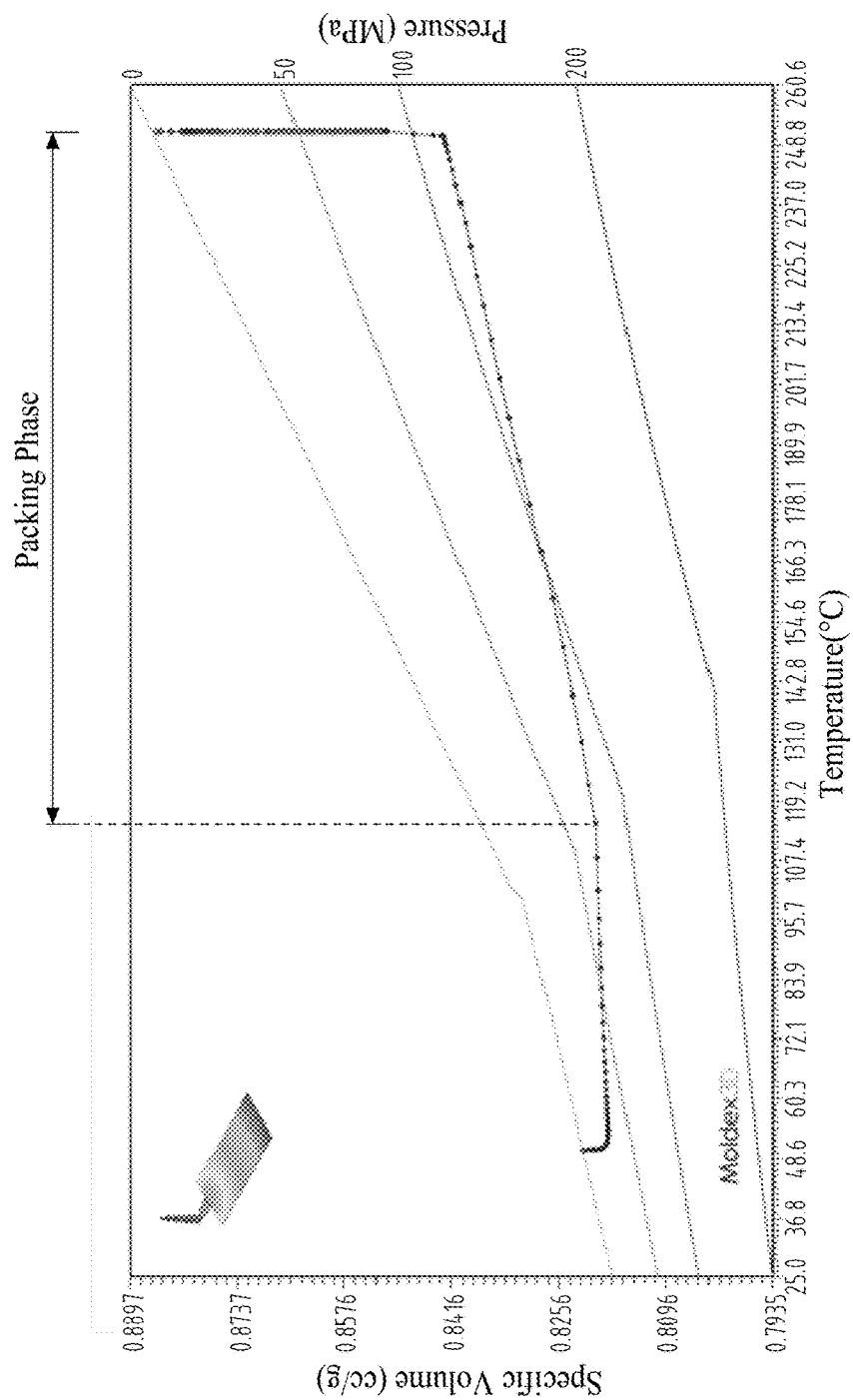
FIG. 10 is a state waveform of a portion of the simulating domain from the virtual molding using the packing pressure profile in FIG. 9 in accordance with some embodiments of the present disclosure.

FIG. 10 is a state waveform of a portion of the simulating domain 70 from the virtual molding using the packing pressure profile in FIG. 9 in accordance with some embodiments of the present disclosure. The packing phase of the updated state waveform begins with a starting pressure of 115.889 MPa and ends at a gate-freezing time of 2.687 second, a gate-freezing pressure ($P_{freezing}$) of 70.87 MPa, and a gate-freezing temperature of 114.515° C. The pressure variation of the packing phase of the updated state waveform, dropping from 115.889 MPa at the beginning to 70.87 MPa at the end (the gate-freezing), exceeds the predetermined range. In other words, the packing phase is not considered isobaric; in particular, the pressure at the end of the packing phase is too low and shall be increased. In some embodiments of the present disclosure, when the pressure variation of the packing phase exceeds the predetermined range, the initial packing pressure profile is divided into a plurality of packing sections by adding at least one control node.

Figure 11:
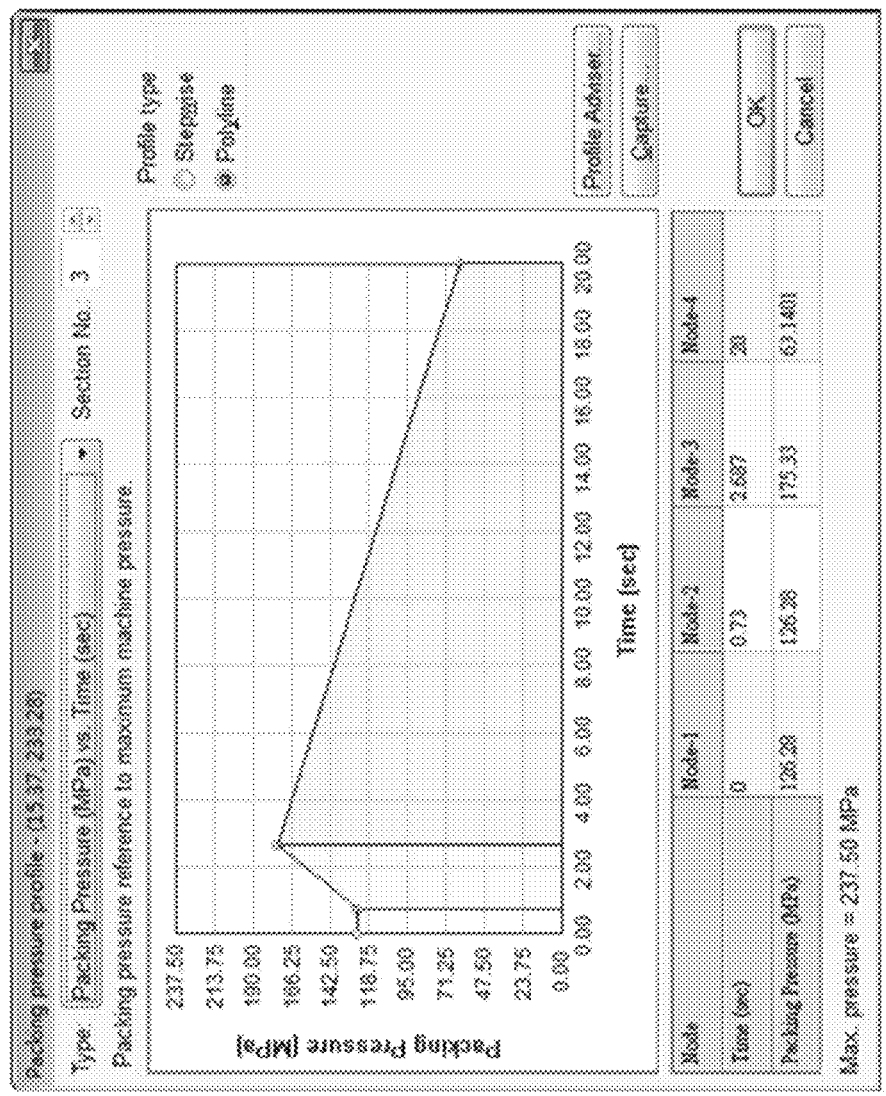
FIG. 11 is a packing pressure profile to be applied to at least a portion of the genuine domain in accordance with some embodiments of the present disclosure.

FIG. 11 is a packing pressure profile to be applied to at least a portion of the genuine domain 60 in accordance with some embodiments of the present disclosure. The packing pressure profile in FIG. 9 is considered here an initial packing pressure profile, the state waveform in FIG. 10 is considered here an initial state waveform, and packing pressure profile in FIG. 11 is relatively considered here an updated packing pressure profile.

In some embodiments of the present disclosure, the packing phase before the gate-freezing time is divided into two sections: a first section from the node 1 to the node 2 and a second section from the node 2 to the node 3. According to the updated state waveform in FIG. 10, the previous gate-freezing time of 3.809 second (the node 3) is replaced by the new gate-freezing time of 2.687 second.

Referring to FIG. 10, the pressure of the updated state waveform exceeds the predetermined range at an exceeding time of 0.90 second with a pressure of 109.8 MPa. In some embodiments of the present disclosure, the newly added control node is set at a time ahead of the exceeding time; for example, with a time step ahead of the exceeding time, and the time step is the one used in the virtual molding for solving the governing equations (1)-(4). In some embodiments of the present disclosure, the new control node is set at a time of 0.73 second, which is a time ahead of the exceeding time (0.90 second). Referring to FIG. 11, the first section (from the node 1 to the node 2) of the updated packing pressure profile is set to perform the same holding pressure (126.28 MPa). In some embodiments of the present disclosure, the pressure (175.33 MPa) of the new gate-freezing time of the new packing section (from the node 2 to the node 3) is calculated by $P_{h2}+((\Delta P/P_{h1})*P_{h2})$, where $P_{h2}$ represents the holding pressure (126.28 MPa) of the previous packing pressure profile in FIG. 9, $\Delta P$ represents the pressure difference of the packing phase in FIG. 10, $P_{h1}$ represents the starting pressure of the packing phase in FIG. 10.

Figure 12:
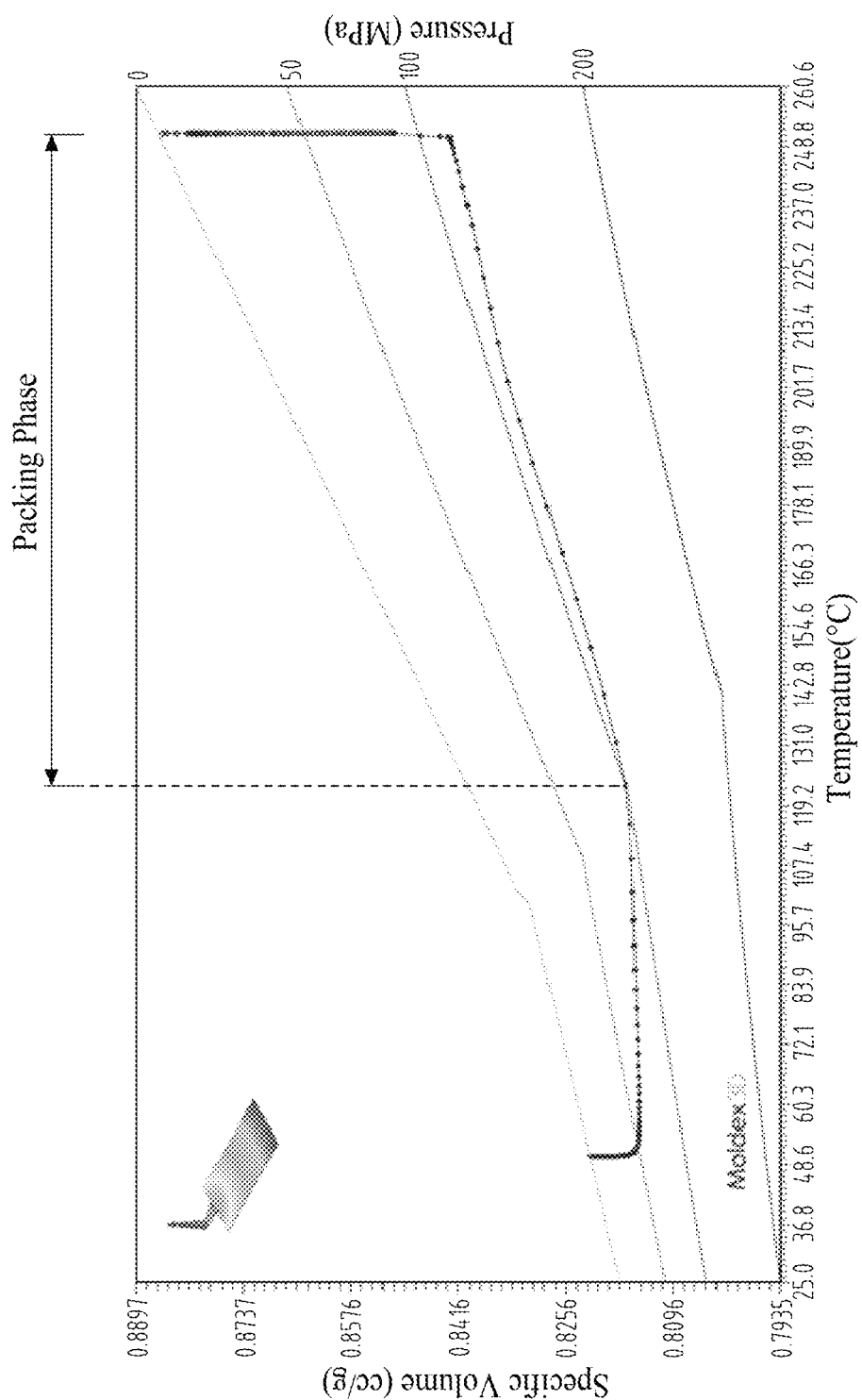
FIG. 12 is a state waveform of a portion of the simulating domain from the virtual molding using the packing pressure profile in FIG. 11 in accordance with some embodiments of the present disclosure.

FIG. 12 is a state waveform of a portion of the simulating domain 60 from the virtual molding using the packing pressure profile in FIG. 11 in accordance with some embodiments of the present disclosure. The packing phase of the state waveform begins with a starting pressure of 115.889 MPa and ends at a gate-freezing time of 2.687 second, a gate-freezing pressure ($P_{freezing}$) of 96.91 MPa, and a gate-freezing temperature of 115.21° C. The pressure variation of the packing phase of the state waveform, dropping from 115.889 MPa at the beginning to 96.91 MPa at the end (the gate-freezing node), shows the packing phase is not isobaric, i.e., the pressure (96.91 MPa) at the end of the packing phase exceeds the user-defined range (5% of the starting pressure) and shall be further increased.

Figure 13:
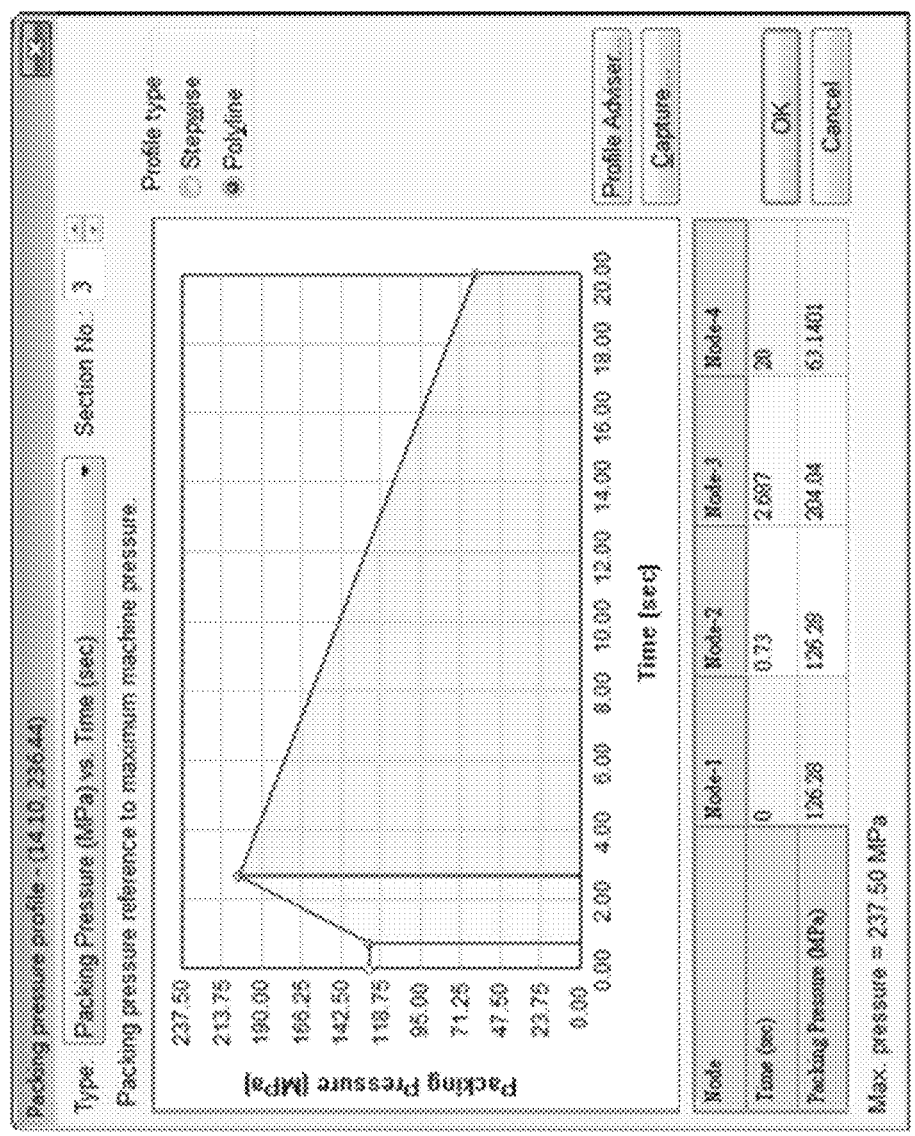
FIG. 13 is a packing pressure profile to be applied to at least a portion of the genuine domain in accordance with some embodiments of the present disclosure.

FIG. 13 is a packing pressure profile to be applied to at least a portion of the genuine domain 60 in accordance with some embodiments of the present disclosure. The packing pressure profile in FIG. 11 is considered here an initial packing pressure profile, the state waveform in FIG. 12 is considered here an initial state waveform, and packing pressure profile in FIG. 13 is relatively considered here an updated packing pressure profile.

In some embodiments of the present disclosure, when the pressure of the packing phase exceeds the pressure of the transition node by a predetermined range, the obtaining updated packing pressure profile includes setting a holding pressure of a control node of the updated packing pressure profile while taking into consideration a pressure difference of the packing phase. The updated packing pressure profile is obtained by changing the pressure of the new control node 2 in FIG. 11, which takes into consideration the pressure difference of the packing phase of the state waveform. In some embodiments of the present disclosure, the new pressure of the packing section (from the node 2 to the node 3) in FIG. 13 is calculated by $(P_{h3}+((\Delta P/P_{h2})*P_{h3})=204.04$ MPa, where $P_{h3}$ represents the previous holding pressure (175.33 MPa) of the node 3 in FIG. 11, $\Delta P$ represents the pressure difference of the packing phase in FIG. 12, and $P_{h2}$ represents the starting pressure of the packing phase in FIG. 12.

Figure 14:
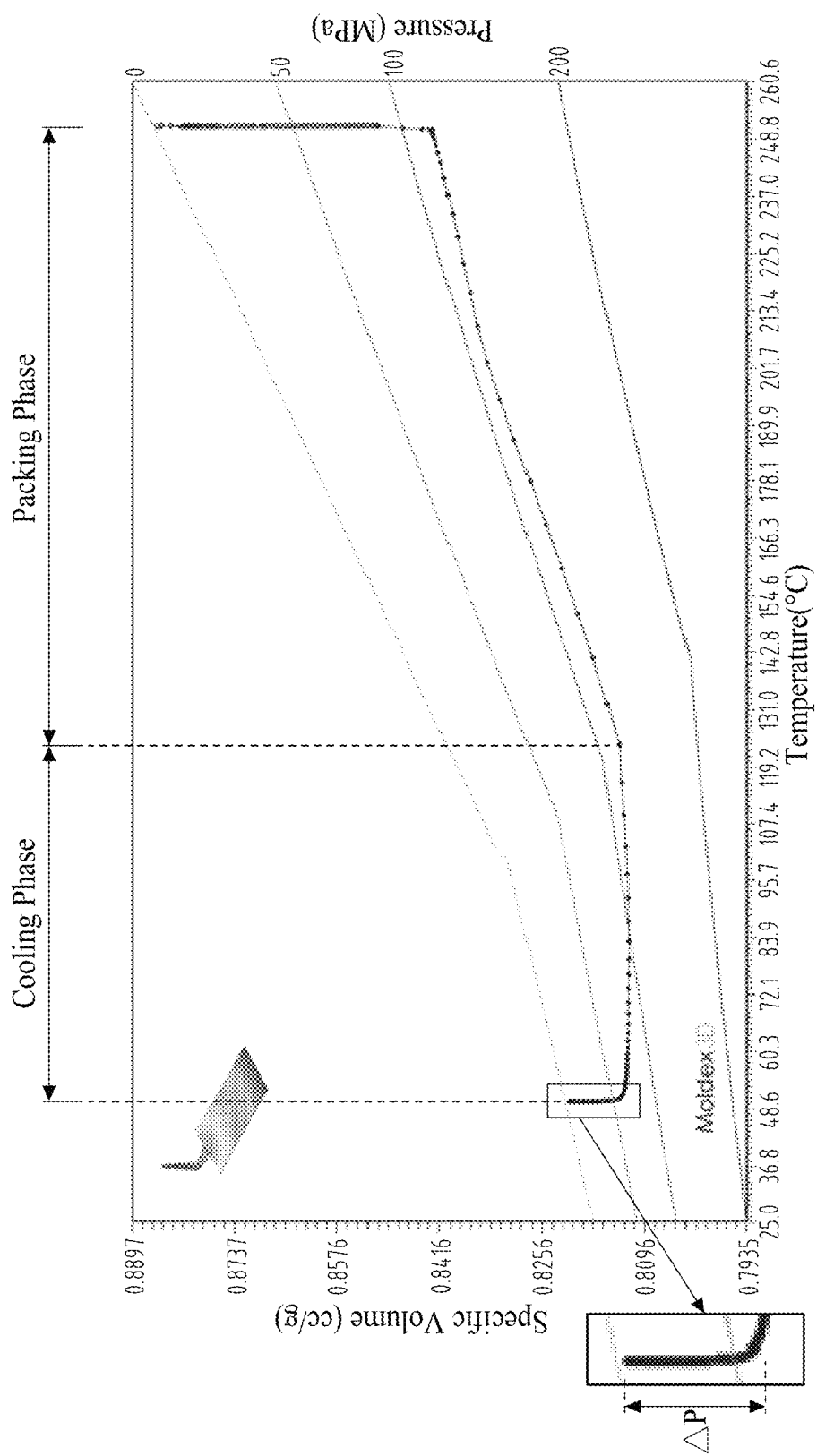
FIG. 14 is a state waveform of a portion of the simulating domain from the virtual molding using the packing pressure profile in FIG. 13 in accordance with some embodiments of the present disclosure.

FIG. 14 is a state waveform of a portion of the simulating domain 60 from the virtual molding using the packing pressure profile in FIG. 13 in accordance with some embodiments of the present disclosure. The packing phase of the state waveform begins with a starting pressure of 115.889 MPa and ends at a gate-freezing time of 2.687 second, with a gate-freezing pressure of 114.758 MPa and a gate-freezing temperature of 115.21° C. The packing phase of the state waveform, dropping from 115.889 MPa at the beginning to 114.758 MPa at the end (the gate-freezing node), shows that pressure variation of the packing phase is within the user-defined range (5% of the starting pressure), and can be considered isobaric.

After the gate-freezing node of 2.687 second, the state waveform ends the packing phase and enters the cooling phase, and the gate-freezing node is considered as a transition node between the packing phase and the cooling phase, wherein a substantial isochoric cooling phase is preferred. However, the specific volume variation of the cooling phase (from the gate-freezing node to the end of the molding process) is larger than a predetermined range (for example, 0.2% of the specific volume at the beginning of the cooling phase (the gate-freezing node); in other words, the cooling phase is not considered isochoric. In addition, the updated state waveform of the molding resin at the end of the cooling process does not drop back to the normal pressure as shown in the close-up view, because the end of the packing phase is not properly set. In some embodiments of the present disclosure, the present disclosure solves these drawbacks by shortening the packing phase while taking into consideration a designed specific volume of the molding product.

Referring to FIG. 14, the packing phase ends at the gate-freezing time of 2.687 second. In some embodiments of the present disclosure, the present disclosure sets the ending of the packing phase of the packing pressure profile taking into consideration of the timing of the state waveform having the designed specific volume of the molding product, instead of the gate-freezing time. For example, the designed specific volume of the molding product is 0.828 cc/g at normal pressure, which corresponds to an ejection temperature of 60.3° C. Furthermore, the pressure and the temperature of the state waveform corresponding to the designed specific volume of the molding resin are 163.63 MPa and 159.89° C., respectively; in addition, the timing of the state waveform having the designed specific volume of the molding resin is 1.67 second.

Figure 15:
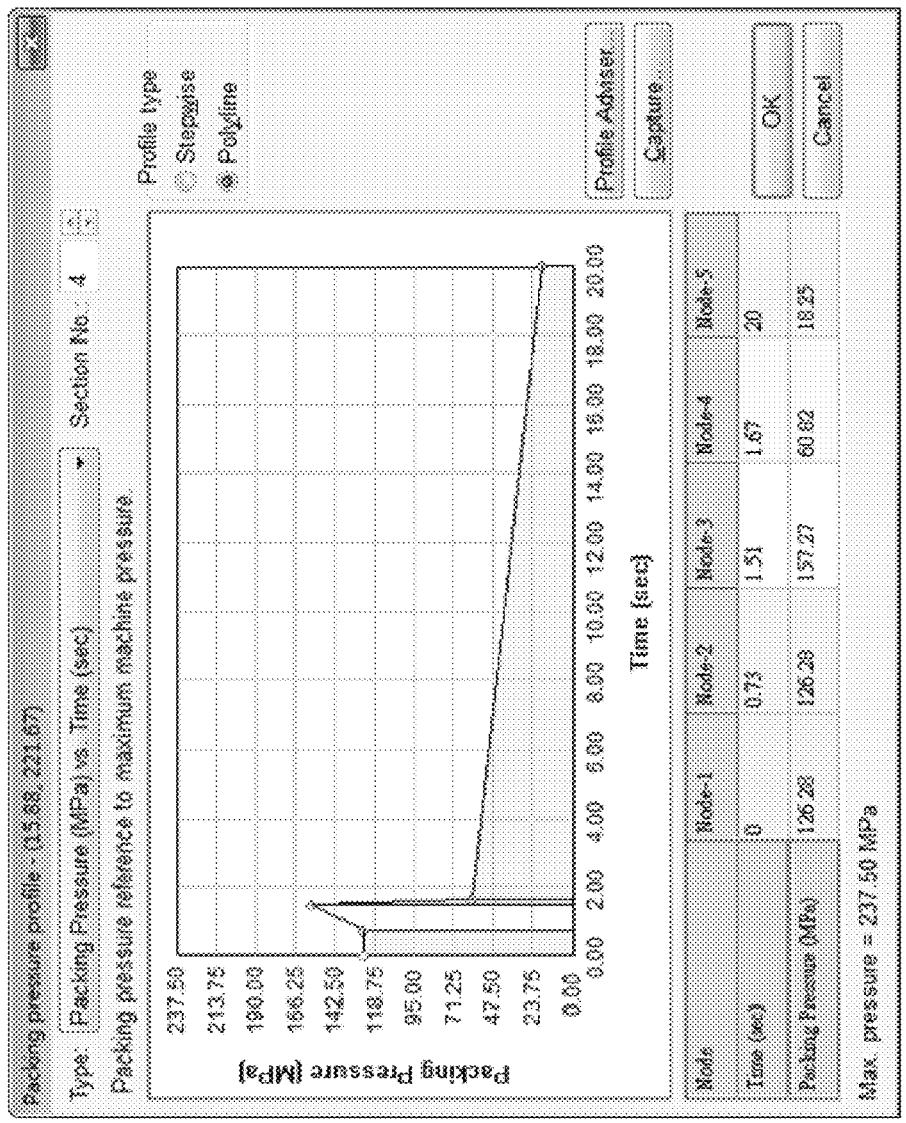
FIG. 15 is a packing pressure profile to be applied to at least a portion of the genuine domain in accordance with some embodiments of the present disclosure.

FIG. 15 is a packing pressure profile to be applied to at least a portion of the genuine domain 60 in accordance with some embodiments of the present disclosure. The packing pressure profile in FIG. 13 is considered here an initial packing pressure profile, the state waveform in FIG. 14 is considered here an initial state waveform, and packing pressure profile in FIG. 15 is relatively considered here an updated packing pressure profile.

In some embodiments of the present disclosure, when the specific volume variation of the cooling phase is larger than a predetermined range, the updated packing pressure profile is obtained by shortening the packing phase while taking into consideration a designed specific volume of the molding product. In some embodiments of the present disclosure, the updated packing pressure profile is obtained by changing the end of the packing phase from the gate-freezing time of 2.687 second to be 1.67 second (the node 4).

In addition, the specific volume variation of the state waveform in the cooling phase (from the gate-freezing node to the end of the molding process) exceeds the user-defined range (0.2% of the specific volume at the gate-freezing node) and shall be decreased. To avoid changing the isochoric packing phase, the packing phase of the packing pressure profile in divided into three sections: a first section from the node 1 to the node 2, a second section from the node 2 to the node 3, and a third section from the node 3 to the node 4. The new third section is designed to decrease the packing pressure so as overcome the exceeding variation of the specific volume variation in the cooling phase, while maintaining the isochoric packing phase. In some embodiments of the present disclosure, the updated packing pressure profile is obtained by setting a pressure-decreasing node of the updated packing pressure profile, wherein the pressure-decreasing node is set one time step ahead of the ending of the packing phase. For example, the timing (1.51 second) for decreasing the packing pressure is set to be started from the node 3, which is one time step ahead of the new ending of the packing phase (1.67 second), instead of starting from the node 2. In some embodiments of the present disclosure, the time step is the one used in the virtual molding for solving the governing equations (1)-(4).

In addition, the packing pressure of the new node 3 at the timing of 1.51 second (starting to decrease the packing pressure) is set to be 157.27 MPa in FIG. 15, which is calculated by the interpolation between the node 2 and the node 3 of the previous packing pressure profile in FIG. 13. Furthermore, referring to FIG. 14, the updated packing waveform of the molding resin at the end of the cooling process does not drop back to the normal pressure as shown in the close-up view, and there is a pressure difference (45 MPa) from the ending pressure of the cooling phase to the normal pressure. In some embodiments of the present disclosure, the present disclosure sets the packing pressure of the node 4 in FIG. 15 taking into consideration of the pressure difference.

In addition, the pressure of the updated state waveform at the timing of 1.51 second (starting to decrease the packing pressure) is 116.37 MPa in FIG. 14, and the corresponding pressure of the packing pressure profile at the timing of 1.51 second (starting to decrease the packing pressure) is 157.27 MPa in FIG. 15. In some embodiments of the present disclosure, the packing pressure (60.82 MPa) of the node 4 in FIG. 15 is set by using the proportion of $((\Delta P)/P3')*P3)$, where P3' represents the pressure of the updated state waveform at the timing of 1.51 second in FIG. 14, while P3 represents the pressure of the packing pressure profile at the timing of 1.51 second in FIG. 15. In addition, considering the pressure of the packing pressure profile after the packing phase is generally decreasing to the normal pressure, the pressure of the packing pressure profile in the cooling phase following the packing phase is temporarily set to be a 30% of the ending pressure of the packing phase.

Figure 16:
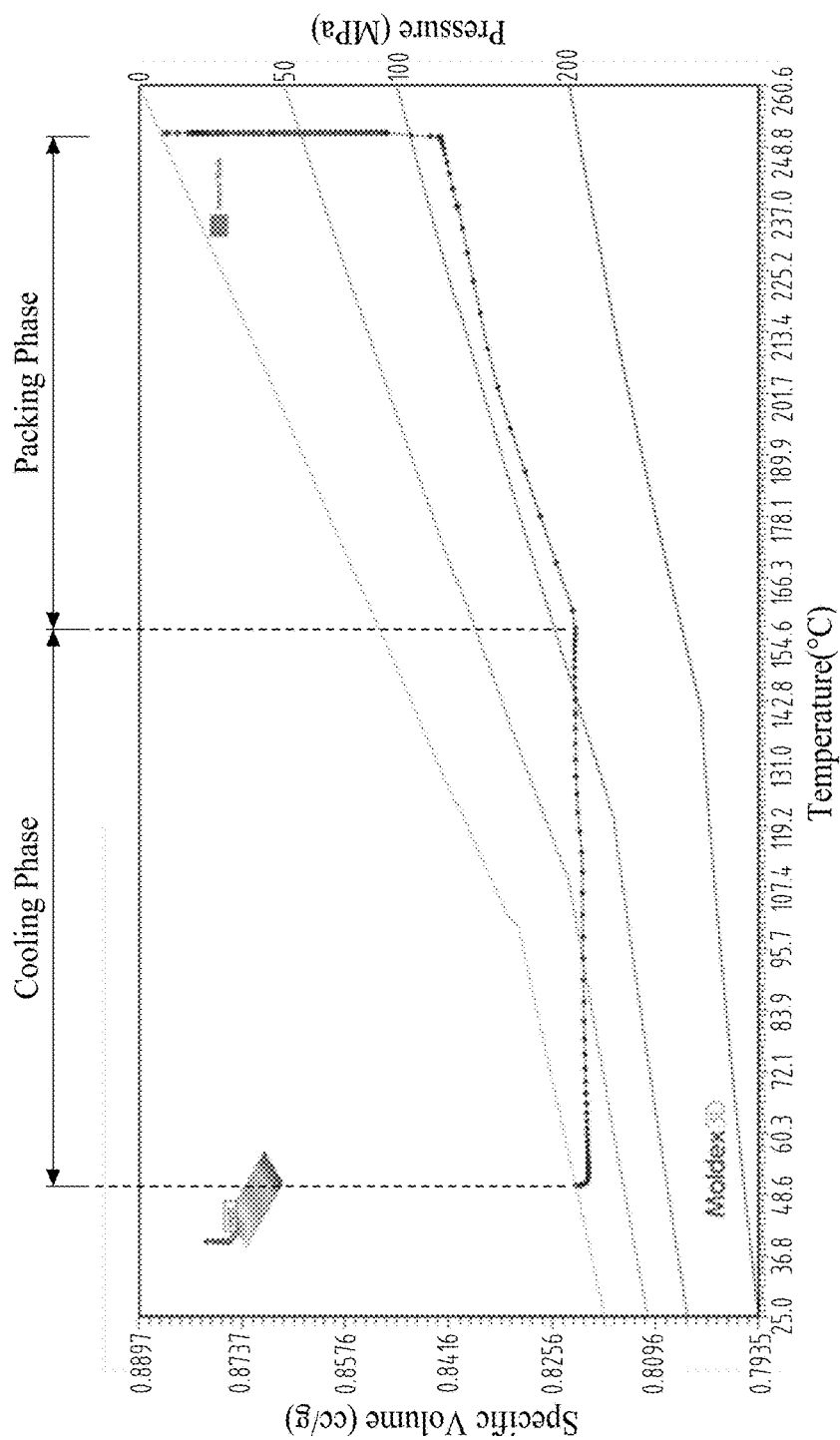
FIG. 16 is a state waveform of a portion of the simulating domain from the virtual molding using the packing pressure profile in FIG. 15 in accordance with some embodiments of the present disclosure.

FIG. 16 is a state waveform of a portion of the simulating domain 60 from the virtual molding using the packing pressure profile in FIG. 15 in accordance with some embodiments of the present disclosure. The packing phase of the state waveform, beginning with a starting pressure of 115.889 MPa and ends at a timing of 1.67 second with an ending pressure of 116.36 MPa, shows that pressure variation of the packing phase is within the user-defined range (5% of the starting pressure), and can be considered isobaric.

After the transition node at the timing of 1.67 second between the packing phase and the cooling phase, the state waveform enters the cooling phase, wherein a substantial isochoric cooling phase is preferred. However, the specific volume variation of the cooling phase (from the transition node to the end of the molding process) is larger than a predetermined range (for example, 0.2% of the specific volume at the transition node, i.e., 0.8242-0.8209 cc/g); in other words, the cooling phase is not considered isochoric. In some embodiments of the present disclosure, the present disclosure solves this drawback by dividing the initial packing pressure profile into a plurality of cooling sections by adding at least one control node, i.e., dividing the previous cooling phase with a single section into multiple sections by adding control nodes (the new node 5 and node 6).

Figure 17:
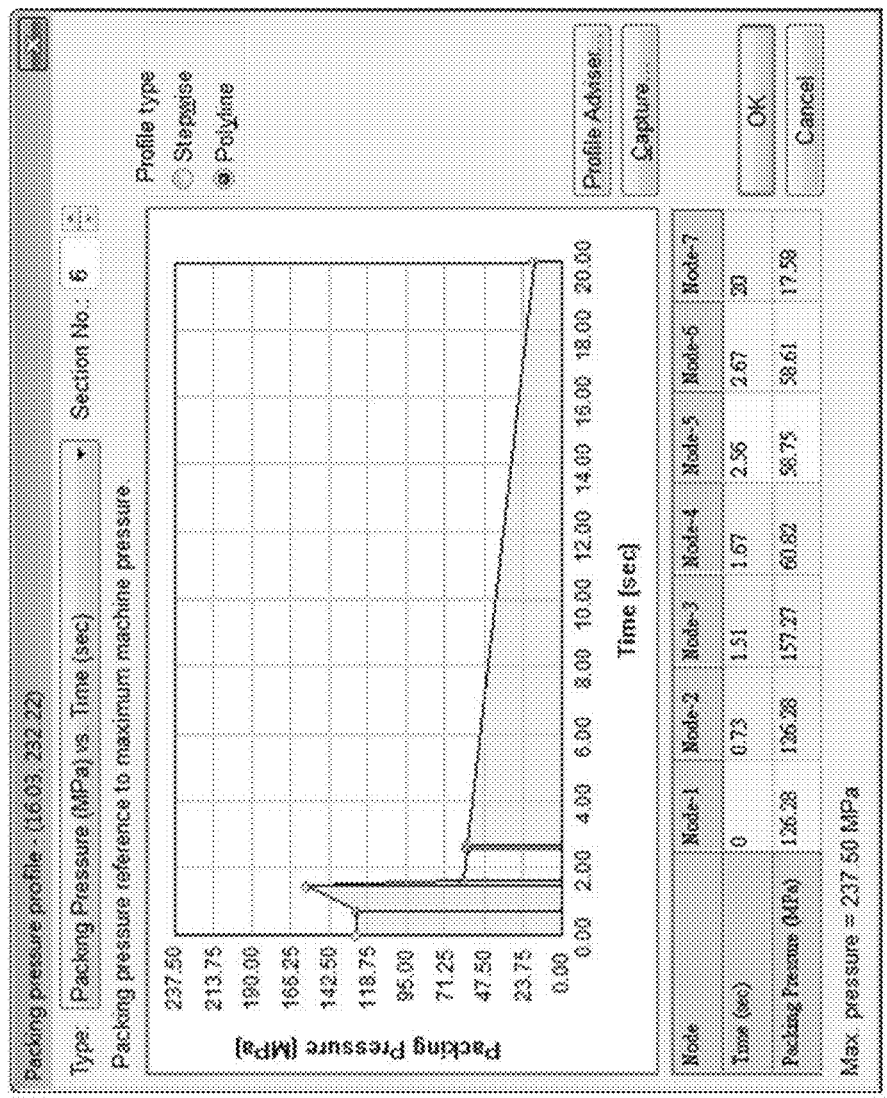
FIG. 17 is a packing pressure profile to be applied to at least a portion of the genuine domain in accordance with some embodiments of the present disclosure.

FIG. 17 is a packing pressure profile to be applied to at least a portion of the genuine domain 60 in accordance with some embodiments of the present disclosure. The packing pressure profile in FIG. 15 is considered here an initial packing pressure profile, the state waveform in FIG. 164 is considered here an initial state waveform, and packing pressure profile in FIG. 17 is relatively considered here an updated packing pressure profile.

In some embodiments of the present disclosure, the previous cooling phase with a single section (from the node 4 to the node 5) in FIG. 15 is divided into three sections with two newly added nodes (the node 5 and node 6) in FIG. 17: a first section from the node 4 to the node 5, a second section from the node 5 to the node 6, and a third section from the node 6 to the node 7.

Referring to the updated state waveform in FIG. 16, the specific volume variation exceeds the predetermined range at an exceeding time of 0.267 second with a specific volume of 0.8206 cc/g. In other words, the portion of the cooling phase before the exceeding timing (0.267 second) is considered isochoric and shall be maintained. To avoid changing the isochoric portion of the cooling phase while adjusting the other portion of the cooling phase, the cooling phase of the packing pressure profile in divided into the three sections by adding the node 5 and the node 6.

In some embodiments of the present disclosure, the at least one new control node is set at a time ahead of the exceeding time and at the exceeding time. For example, the newly added control node (the new node 6 in FIG. 17) is set at the exceeding timing (2.67 second), and the newly added control node (the new node 5 in FIG. 17) is set at a time (2.56 second) with a time step ahead of the exceeding timing (2.67 second). In some embodiments of the present disclosure, the time step is the one used in the virtual molding for solving the governing equations (1)-(4), and the new control node is set at a time of 2.56 second.

In some embodiments of the present disclosure, the pressure of the newly added control node 5 is set to be 58.75 MPa in FIG. 17, which is calculated by the interpolation between the node 4 and the node 5 of the previous packing pressure profile in FIG. 15. In some embodiments of the present disclosure, the pressure (58.61 MPa) of the newly added control node 6 is calculated by using a formula (P4−(ΔV)/V)*P4), where V represents the starting specific volume at the beginning of the cooling phase, ΔV represents the specific volume difference between the beginning and the exceeding timing, while P4 represents the pressure of the updated packing waveform at the exceeding timing (0.267 second) in FIG. 16. In addition, considering the pressure of the packing pressure profile after the packing phase is generally decreasing to the normal pressure, the ending pressure (17.58 MPa at the node 7) of the packing pressure profile of the cooling phase following the packing phase is temporarily set to be a 30% of the ending pressure of the packing phase.

Figure 18:
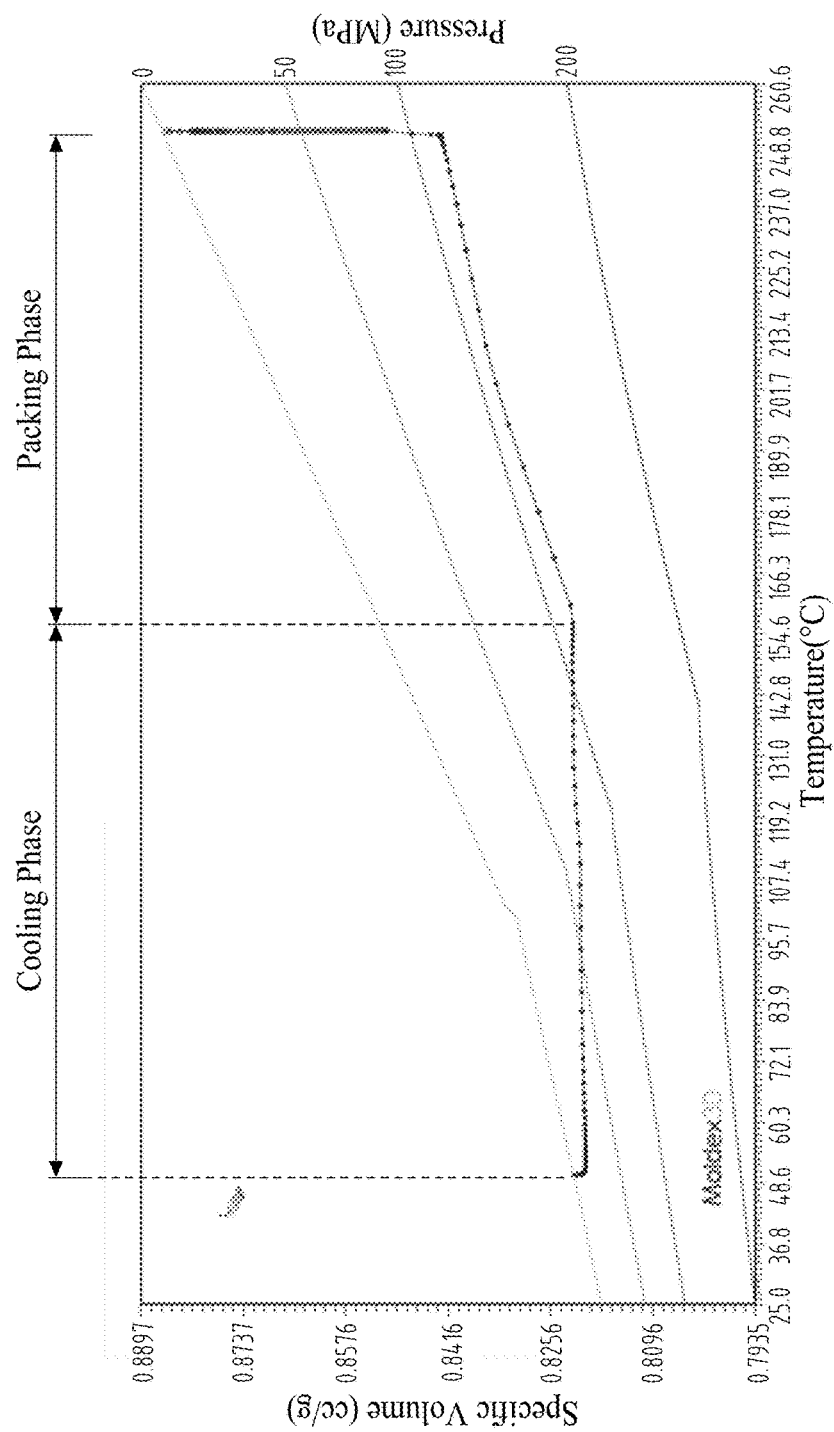
FIG. 18 is a state waveform of a portion of the simulating domain from the virtual molding using the packing pressure profile in FIG. 17 in accordance with some embodiments of the present disclosure.

FIG. 18 is a state waveform of a portion of the simulating domain 60 from the virtual molding using the packing pressure profile in FIG. 17 in accordance with some embodiments of the present disclosure. The packing phase of the state waveform, beginning with a starting pressure of 115.889 MPa and ends at a timing of 1.67 second with an ending pressure of 116.36 MPa, shows that pressure variation of the packing phase is within the user-defined range (5% of the packing pressure (P1)), and can be considered isobaric.

However, the specific volume (0.8206 cc/g) at the timing of 2.67 second exceeds the bottom limit (0.8209 cc/g) of the predetermined range (for example, 0.2% of the specific volume at the transition node, i.e., 0.8242-0.8209 cc/g). In other words, the specific volume variation of the cooling phase after the transition node (at a timing of 2.67 second) exceeds the predetermined range, and the cooling phase is not considered isochoric. In some embodiments of the present disclosure, the present disclosure solves this drawback by adjusting the packing pressure at the exceeding time.

Figure 19:
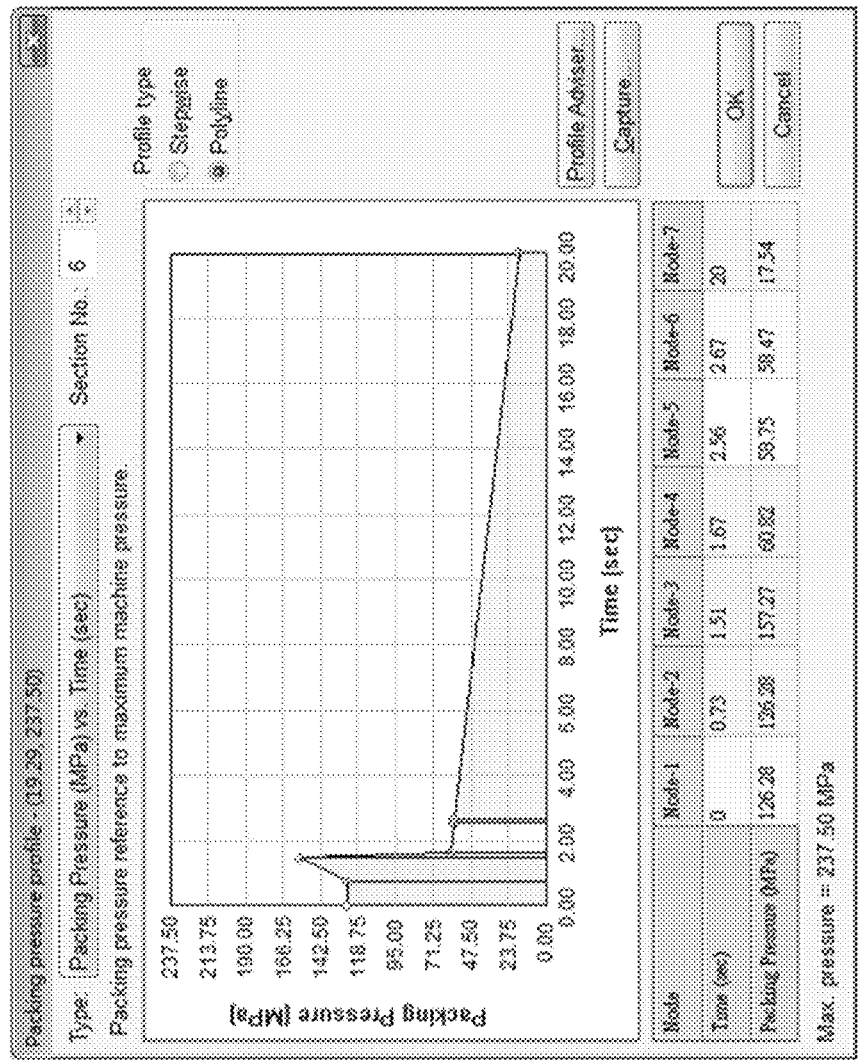
FIG. 19 is a packing pressure profile to be applied to at least a portion of the genuine domain in accordance with some embodiments of the present disclosure.

FIG. 19 is a packing pressure profile to be applied to at least a portion of the genuine domain 60 in accordance with some embodiments of the present disclosure. The packing pressure profile in FIG. 17 is considered here an initial packing pressure profile, the state waveform in FIG. 18 is considered here an initial state waveform, and packing pressure profile in FIG. 19 is relatively considered here an updated packing pressure profile.

In some embodiments of the present disclosure, the pressure of the control node 6 is calculated by using a formula (P5−(ΔV)/V)*P5), where V represents the starting specific volume at the beginning of the cooling phase, ΔV represents the specific volume difference between the beginning and the exceeding timing, while P5 represents the pressure of the updated packing waveform at the exceeding timing (0.267 second) in FIG. 18. As a result, the packing pressure of the control node is changed from 58.61 MPa to 58.47 MPa. In addition, considering the pressure of the packing pressure profile after the packing phase is generally decreasing to the normal pressure, the ending pressure (17.54 MPa at the node 7) of the packing pressure profile of the cooling phase following the packing phase is temporarily set to be a 30% of the ending pressure of the packing phase.

Figure 20:
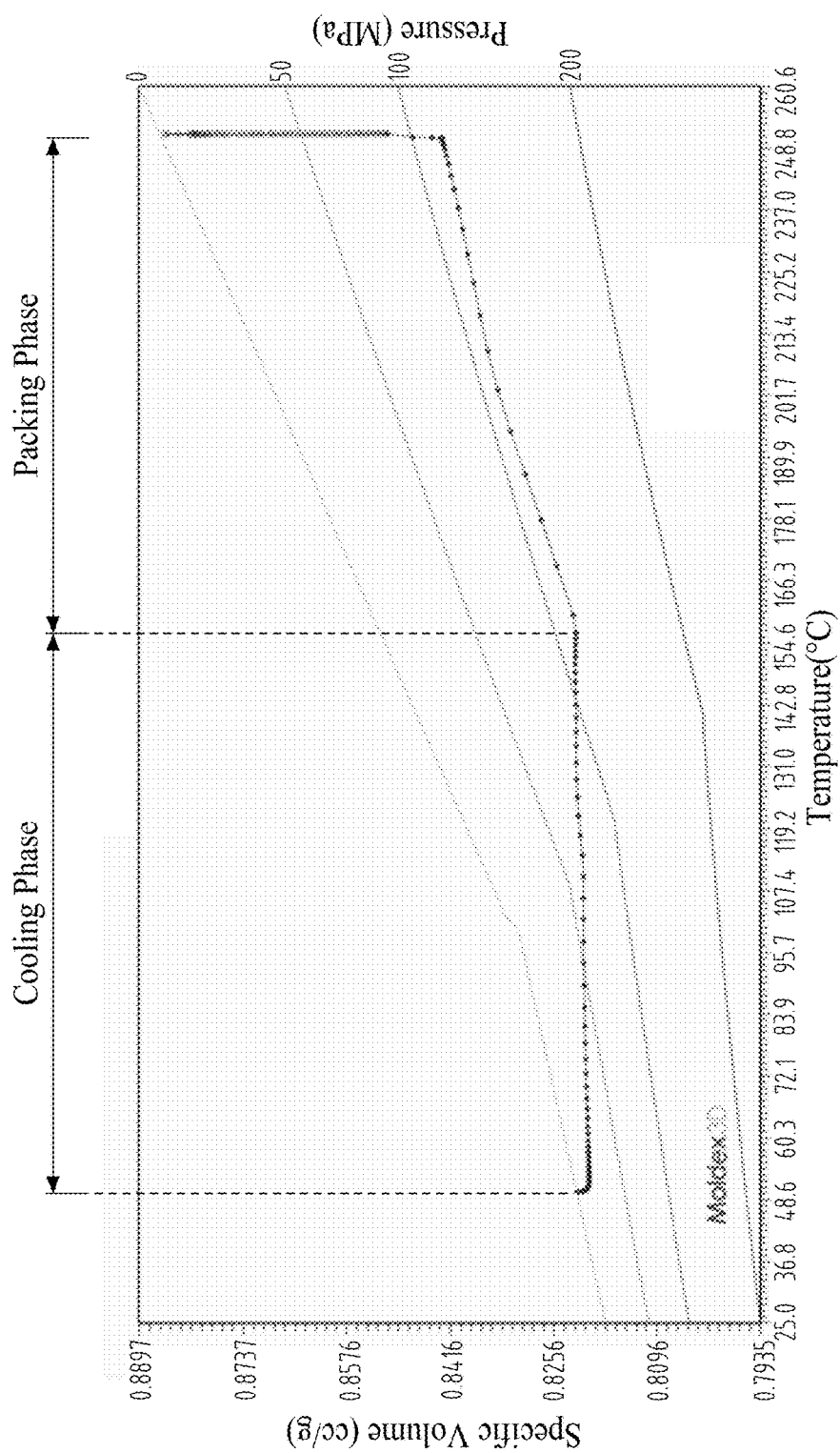
FIG. 20 is a state waveform of a portion of the simulating domain from the virtual molding using the packing pressure profile in FIG. 19 in accordance with some embodiments of the present disclosure.

FIG. 20 is a state waveform of a portion of the simulating domain 60 from the virtual molding using the packing pressure profile in FIG. 19 in accordance with some embodiments of the present disclosure. The packing phase of the state waveform, beginning with a starting pressure of 115.889 MPa and ends at a timing of 1.67 second with an ending pressure of 116.36 MPa, shows that pressure variation of the packing phase is within the user-defined range (5% of the starting pressure), and can be considered isobaric.

However, the specific volume (0.8207 cc/g) at the timing of 2.67 second still exceeds the bottom limit (0.8209 cc/g) of the predetermined range (for example, 0.2% of the specific volume at the transition node, i.e., 0.8242-0.8209 cc/g). In other words, the specific volume variation of the cooling phase after the transition node (at a timing of 2.67 second) exceeds the predetermined range, and the cooling phase is not considered isochoric. In some embodiments of the present disclosure, the present disclosure solves this drawback by adjusting the packing pressure at the exceeding time.

Figure 21:
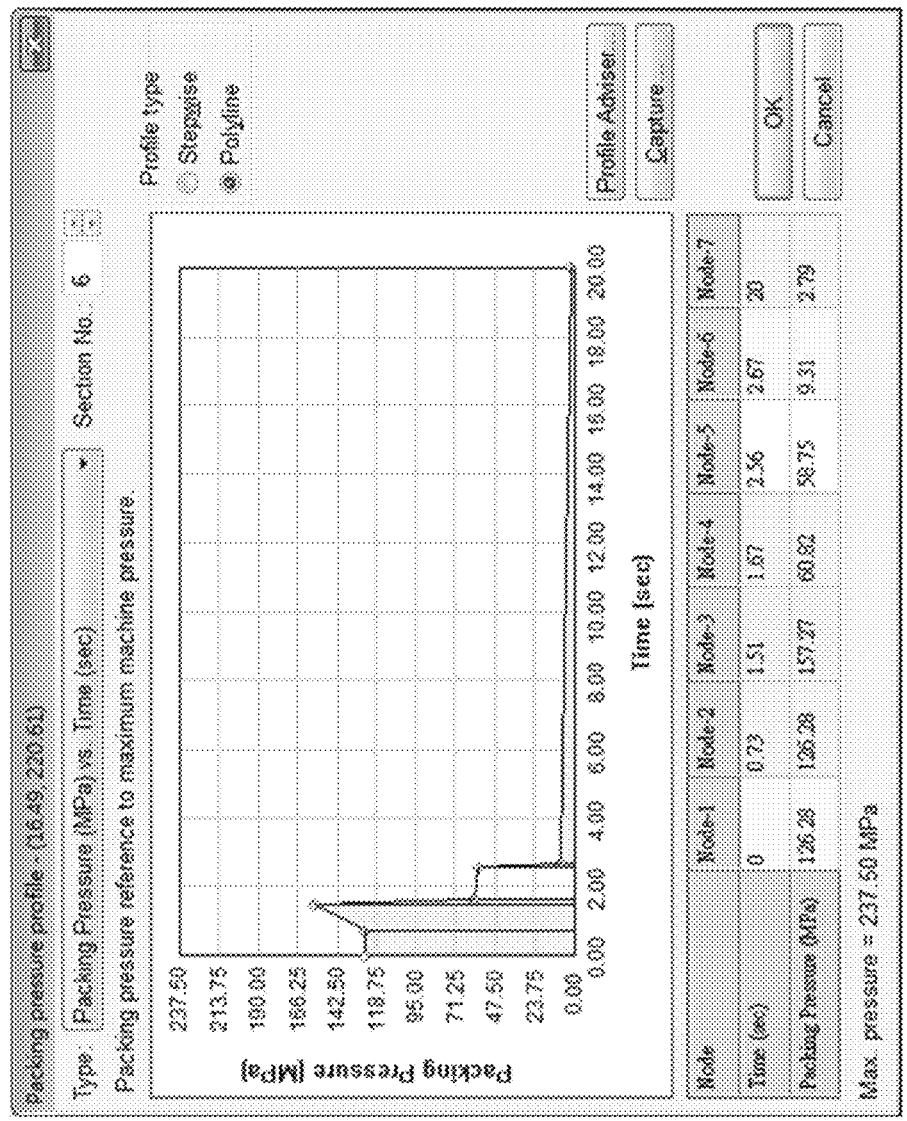
FIG. 21 is a packing pressure profile to be applied to at least a portion of the genuine domain in accordance with some embodiments of the present disclosure.

FIG. 21 is a packing pressure profile to be applied to at least a portion of the genuine domain 60 in accordance with some embodiments of the present disclosure. The packing pressure profile in FIG. 19 is considered here an initial packing pressure profile, the state waveform in FIG. 20 is considered here an initial state waveform, and packing pressure profile in FIG. 21 is relatively considered here an updated packing pressure profile. The operations described in FIG. 19 and FIG. 20 are repeated several times, and the pressures of the control node 6 and the control node 7 are adjusted accordingly to 9.31 MPa and 2.79 MPa respectively.

Figure 22:
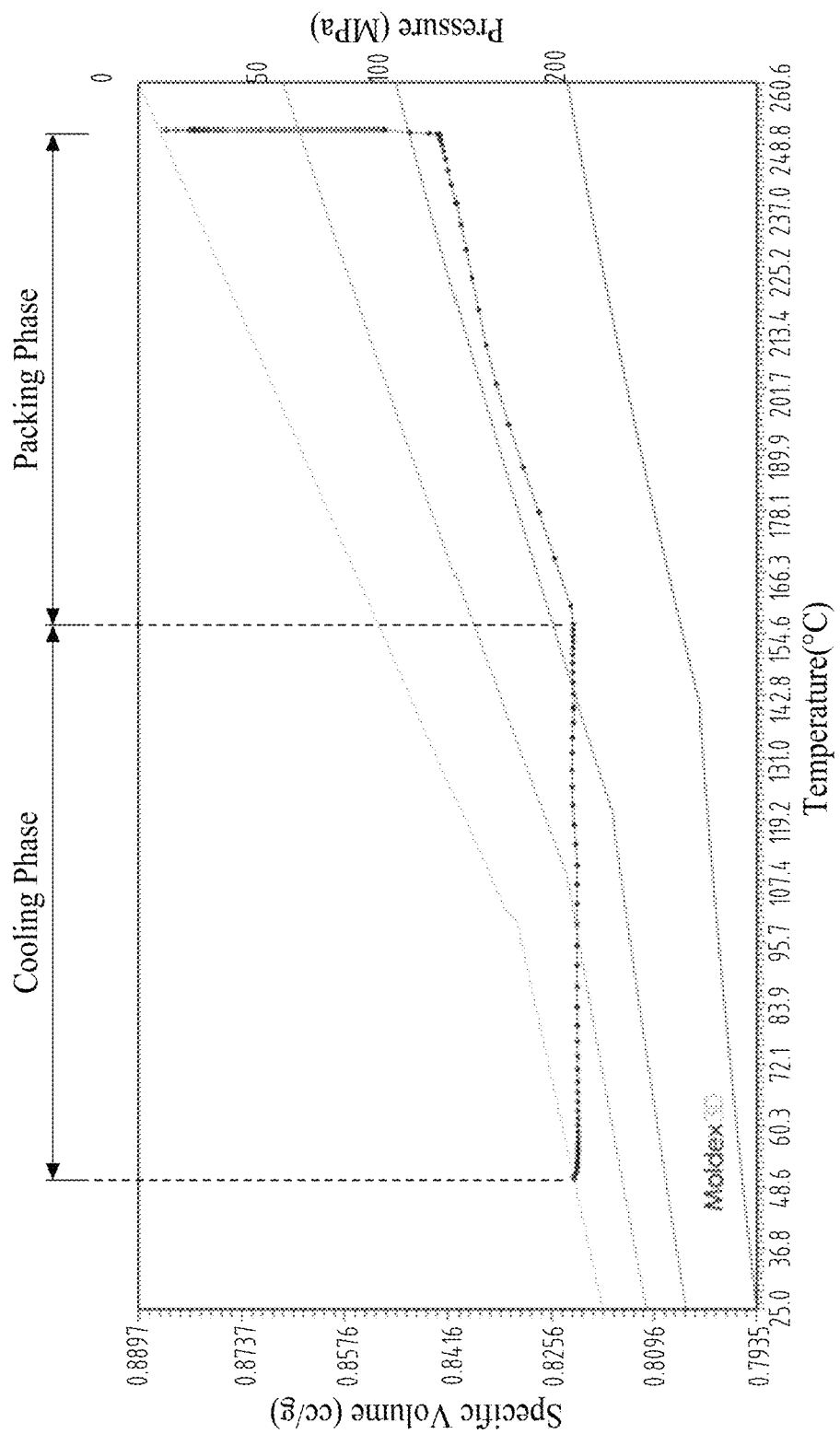
FIG. 22 is a state waveform of a portion of the simulating domain from the virtual molding using the packing pressure profile in FIG. 21 in accordance with some embodiments of the present disclosure.

FIG. 22 is a state waveform of a portion of the simulating domain 60 from the virtual molding using the packing pressure profile in FIG. 21 in accordance with some embodiments of the present disclosure. The packing phase of the state waveform, beginning with a holding pressure of 115.889 MPa and ends at a timing of 1.51 second, shows that pressure variation of the packing phase is within the user-defined range (5% of the packing pressure (P1)), and can be considered isobaric. In addition, the specific volume variation of the cooling phase after the packing phase (at a timing of 1.67 second) is within the user-defined range (for example, 0.2% of the specific volume at the transition node), and can be considered isochoric.

In some embodiments of the present disclosure, the initial holding pressure of the packing phase may be optionally reset to a value between an upper limit (the pressure of the isochoric phase) and a bottom limit (the pressure without pressure-dropping phenomena).

Referring back to FIG. 4, in the step 39, the molding condition of the molding machine 10 is set to apply an actual pressure to the at least a portion of the genuine domain 60 while taking into consideration the molding state waveform. In some embodiments of the present disclosure, the molding condition (e.g., the operation condition of the screw-driving motor 12) of the molding machine 10 is set to implement the packing pressure profile shown in FIG. 21 to the nozzle 29 of the genuine domain 60 so as to implement the state waveform shown in FIG. 22 to the gate portion 25 of the genuine domain 60. In some embodiments of the present disclosure, the present disclosure may implement the packing pressure profile shown in FIG. 21 to the nozzle 29 of the genuine domain 60 taking into consideration the dynamic movement of the screw 15 in the barrel 11, a volume variation of the molding material 16 in the barrel 11, or the combination thereof, as disclosed on U.S. Pat. No. 8,868,389, assigned to the present assignee and the entirety of which is herein incorporated by reference.

In some embodiments of the present disclosure, a method for operating a molding machine includes steps of specifying a simulating domain, wherein the simulating domain corresponds to a genuine domain in a mold disposed on a molding machine, wherein the genuine domain has a mold cavity to be filled with a molding resin from the molding machine; performing at least one virtual molding to generate a state waveform expressing a relationship between an in-mold pressure and an in-mold temperature of the molding resin; obtaining a packing pressure profile for applying a molding pressure to at least a portion of the genuine domain while taking into consideration the state waveform; repeating the virtual molding while taking into consideration the packing pressure profile to generate an updated state waveform of the molding resin; and setting the molding machine to apply an actual pressure to the at least a portion of the genuine domain while taking into consideration the updated state waveform.

In some embodiments of the present disclosure, a non-transitory computer medium contains computer instructions stored therein for causing a computer processor to perform operations for setting a molding machine, and the operations include steps of specifying a simulating domain, wherein the simulating domain corresponds to a genuine domain in a mold disposed on the molding machine, wherein the genuine domain has a mold cavity to be filled with a molding resin from the molding machine; performing at least one virtual molding to generate a state waveform expressing a relationship between an in-mold pressure and an in-mold temperature of the molding resin; obtaining a packing pressure profile for applying a molding pressure to at least a portion of the genuine domain while taking into consideration the state waveform; repeating the virtual molding while taking into consideration the packing pressure profile to generate an updated state waveform of the molding resin; and setting the molding machine to apply an actual pressure to the at least a portion of the genuine domain while taking into consideration the updated state waveform.

The convention operation of the injection molding may use a constant packing pressure to apply a pressure to the sprue portion of the mold, and the constant packing pressure could be a random value assigned by an operator of the injection machine according to the operator's experience. However, setting the packing pressure of the injection molding requires a large number of trial molding operations and a long setting time actually performed on the injection molding machine because the setting work greatly depends on the know-how and experience of an operator of the injection molding machine, and various physical values affect one another as well.

In contrast, the present disclosure implements the large number of trial molding operations by the molding simulation technique so as to obtain an updated packing pressure profile, which can result in an updated state waveform of the molding resin with the designed shape (specific volume). Subsequently, the molding machine is set to apply an actual pressure to the at least a portion of the genuine domain while taking into consideration the updated packing pressure profile.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for operating a molding machine, comprising steps of:
   specifying a simulating domain corresponding to a genuine domain in a mold disposed on the molding machine, wherein the genuine domain has a mold cavity to be filled with a molding resin from the molding machine to prepare a molding product;
   performing a virtual molding by using an initial packing pressure profile to generate an initial state waveform expressing a relationship between an in-mold pressure and an in-mold temperature of the molding resin;
   obtaining an updated packing pressure profile for applying a molding pressure to at least a portion of the genuine domain while taking into consideration the initial state waveform;
   repeating the virtual molding while taking into consideration the updated packing pressure profile to generate an updated state waveform of the molding resin; and
   setting the molding machine taking into consideration the updated packing pressure profile to perform an actual molding by applying an actual molding pressure to the at least a portion of the genuine domain to prepare the molding product.

2. The method for operating a molding machine of claim 1, wherein the initial state waveform includes a filling phase, a packing phase following the filling phase, and a transition node between the filling phase and the packing phase, wherein the obtaining an updated packing pressure profile comprises:
   when the initial state waveform has a pressure drop larger than a predetermined range around the transition node, performing a backflow adjusting process to generate a new packing pressure of the updated packing pressure profile taking into consideration the pressure drop.

3. The method for operating a molding machine of claim 1, wherein the initial state waveform includes a filling phase, a packing phase following the filling phase, and a transition node between the filling phase and the packing phase, wherein the obtaining an updated packing pressure profile comprises:

when the pressure of the packing phase exceeds the pressure of the transition node by a predetermined range, dividing the initial packing pressure profile into a plurality of packing sections by adding at least one control node;

wherein the at least one control node is set to be a gate-freezing time of the molding process, and the plurality of packing sections have different pressures.

4. The method for operating a molding machine of claim 1, wherein the initial state waveform includes a filling phase, a packing phase following the filling phase, and a transition node between the filling phase and the packing phase, wherein the obtaining an updated packing pressure profile comprises:

when the pressure of the packing phase exceeds the pressure of the transition node by a predetermined range at an exceeding time, dividing the initial packing pressure profile into a plurality of packing sections by adding at least one control node;

wherein the at least one control node is set at a time ahead of the exceeding time, and the plurality of packing sections have different pressures.

5. The method for operating a molding machine of claim 1, wherein the initial state waveform includes a filling phase, a packing phase following the filling phase, and a transition node between the filling phase and the packing phase, wherein the obtaining an updated packing pressure profile comprises:

when the pressure of the packing phase exceeds the pressure of the transition node by a predetermined range, setting a packing pressure of a control node of the updated packing pressure profile while taking into consideration a pressure difference of the packing phase.

6. The method for operating a molding machine of claim 1, wherein the initial state waveform includes a packing phase, a cooling phase following the packing phase, and a transition node between the packing phase and the cooling phase, wherein the obtaining an updated packing pressure profile comprises:

when a specific volume variation of the cooling phase is larger than a predetermined range, shortening the packing phase while taking into consideration a designed specific volume of the molding product.

7. The method for operating a molding machine of claim 6, wherein an ending of the packing phase of the updated packing pressure profile is set at a time taking into consideration a timing of the initial state waveform having the designed specific volume of the molding product.

8. The method for operating a molding machine of claim 7, further comprising a step of setting a pressure-decreasing node of the updated packing pressure profile, wherein the pressure-decreasing node is set one time step ahead of the ending of the packing phase.

9. The method for operating a molding machine of claim 1, wherein the initial state waveform includes a packing phase, a cooling phase following the packing phase, and a transition node between the packing phase and the cooling phase, wherein the obtaining an updated packing pressure profile comprises:

when a specific volume variation of the cooling phase is larger than a predetermined range at an exceeding time, dividing the initial packing pressure profile into a plurality of cooling sections by adding at least one control node, wherein the plurality of cooling sections have different pressures.

10. The method for operating a molding machine of claim 9, wherein the at least one control node is set at a time ahead of the exceeding time.

11. The method for operating a molding machine of claim 9, wherein the at least one control node is set at the exceeding time.

12. A non-transitory computer medium containing computer instructions stored therein for causing a computer processor to perform operations for setting a molding machine, the operations comprising:

specifying a simulating domain corresponding to a genuine domain in a mold disposed on the molding machine, wherein the genuine domain has a mold cavity to be filled with a molding resin from the molding machine to prepare a molding product;

performing a virtual molding by using an initial packing pressure profile to generate an initial state waveform expressing a relationship between an in-mold pressure and an in-mold temperature of the molding resin;

obtaining an updated packing pressure profile for applying a molding pressure to at least a portion of the genuine domain while taking into consideration the initial state waveform;

repeating the virtual molding while taking into consideration the updated packing pressure profile to generate an updated state waveform of the molding resin; and setting the molding machine taking into consideration the updated packing pressure profile to perform an actual molding by applying an actual molding pressure to the at least a portion of the genuine domain to prepare the molding product.

13. The non-transitory computer medium of claim 12, wherein the initial state waveform includes a filling phase, a packing phase following the filling phase, and a transition node between the filling phase and the packing phase, wherein the obtaining an updated packing pressure profile comprises:

when the initial state waveform has a pressure drop larger than a predetermined range around the transition node, performing a backflow adjusting process to generate a new packing pressure of the updated packing pressure profile taking into consideration the pressure drop.

14. The non-transitory computer medium of claim 12, wherein the initial state waveform includes a filling phase, a packing phase following the filling phase, and a transition node between the filling phase and the packing phase, wherein the obtaining an updated packing pressure profile comprises:

when the pressure of the packing phase exceeds the pressure of the transition node by a predetermined range, dividing the initial packing pressure profile into a plurality of packing sections by adding at least one control node;

wherein the at least one control node is set to be a gate-freezing time of the molding process, and the plurality of packing sections have different pressures.

15. The non-transitory computer medium of claim 12, wherein the initial state waveform includes a filling phase, a packing phase following the filling phase, and a transition node between the filling phase and the packing phase, wherein the obtaining an updated packing pressure profile comprises:

when the pressure of the packing phase exceeds the pressure of the transition node by a predetermined range at an exceeding time, dividing the initial packing pressure profile into a plurality of packing sections by adding at least one control node;

wherein the at least one control node is set at a time ahead of the exceeding time, and the plurality of packing sections have different pressures.

16. The non-transitory computer medium of claim 12, wherein the initial state waveform includes a filling phase, a packing phase following the filling phase, and a transition node between the filling phase and the packing phase, wherein the obtaining an updated packing pressure profile comprises:
when the pressure of the packing phase exceeds the pressure of the transition node by a predetermined range, setting a packing pressure of a control node of the updated packing pressure profile while taking into consideration a pressure difference of the packing phase.

17. The non-transitory computer medium of claim 12, wherein the initial state waveform includes a packing phase, a cooling phase following the packing phase, and a transition node between the packing phase and the cooling phase, wherein the obtaining an updated packing pressure profile comprises:
when a specific volume variation of the cooling phase is larger than a predetermined range, shortening the packing phase while taking into consideration a designed specific volume of the molding product.

18. The non-transitory computer medium of claim 17, wherein an ending of the packing phase of the updated packing pressure profile is set at a time taking into consideration a timing of the initial state waveform having the designed specific volume of the molding product.

19. The non-transitory computer medium of claim 18, further comprising a step of setting a pressure-decreasing node of the updated packing pressure profile, wherein the pressure-decreasing node is set one time step ahead of the ending of the packing phase.

20. The non-transitory computer medium of claim 12, wherein the initial state waveform includes a packing phase, a cooling phase following the packing phase, and a transition node between the packing phase and the cooling phase, wherein the obtaining an updated packing pressure profile comprises:
when a specific volume variation of the cooling phase is larger than a predetermined range at an exceeding time, dividing the initial packing pressure profile into a plurality of cooling sections by adding at least one control node, wherein the plurality of cooling sections have different pressures.

21. The non-transitory computer medium of claim 20, wherein the at least one control node is set at a time ahead of the exceeding time.

22. The non-transitory computer medium of claim 20, wherein the at least one control node is set at the exceeding time.

* * * * *